US008614833B2

(12) United States Patent
Oda et al.

(10) Patent No.: US 8,614,833 B2
(45) Date of Patent: Dec. 24, 2013

(54) PRINTER, PRINTER DRIVER, PRINTING SYSTEM, AND PRINT CONTROLLING METHOD

(75) Inventors: Takashi Oda, Niigata (JP); Koei Hoshino, Niigata (JP); Hideyuki Kobayashi, Niigata (JP); Hiroo Yoshida, Niigata (JP); Takashi Tomizuka, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1635 days.

(21) Appl. No.: 11/352,360

(22) Filed: Feb. 13, 2006

(65) Prior Publication Data

US 2007/0019222 A1 Jan. 25, 2007

(30) Foreign Application Priority Data

Jul. 21, 2005 (JP) .................................. 2005-211295
Jul. 26, 2005 (JP) .................................. 2005-216033

(51) Int. Cl.
*H04N 1/40* (2006.01)
*G06F 3/12* (2006.01)

(52) U.S. Cl.
USPC .......... 358/3.28; 358/1.9; 358/448; 358/1.13; 358/426.06; 382/118; 235/435; 715/220

(58) Field of Classification Search
USPC ......................... 358/1.13, 298, 448, 350, 537
See application file for complete search history.

(56) References Cited

U.S. PATENT DOCUMENTS

| 5,528,742 | A | * | 6/1996 | Moore et al. ................... 715/205 |
| 5,649,024 | A | * | 7/1997 | Goldsmith ..................... 382/170 |
| 5,751,434 | A | * | 5/1998 | Narendranath et al. ........ 358/1.9 |
| 6,240,430 | B1 | * | 5/2001 | Deike et al. .................... 715/210 |
| 6,405,169 | B1 | * | 6/2002 | Kondo et al. .................. 704/258 |
| 6,827,279 | B2 | * | 12/2004 | Teraura .......................... 235/492 |
| 2001/0035971 | A1 | * | 11/2001 | Koakutsu et al. ............. 358/1.13 |
| 2001/0042234 | A1 | * | 11/2001 | Sasaki et al. .................. 714/752 |
| 2002/0075507 | A1 | * | 6/2002 | Owen ........................... 358/1.15 |

FOREIGN PATENT DOCUMENTS

| EP | 1480160 A2 | * | 11/2004 |
| JP | A-06-342426 | | 12/1994 |
| JP | A-11-003390 | | 1/1999 |
| JP | A-11-203381 | | 7/1999 |
| JP | 2000148340 A | * | 5/2000 |
| JP | A-2000-148340 | | 5/2000 |
| JP | A-2002-251339 | | 9/2002 |
| JP | A-2002-264424 | | 9/2002 |

OTHER PUBLICATIONS

Nov. 17, 2009 Office Action issued in Japanese Patent Application No. 2005-211295 (with translation).

\* cited by examiner

*Primary Examiner* — Santiago-Cordero Marivellsse
*Assistant Examiner* — Huo Long Chen
(74) *Attorney, Agent, or Firm* — Oliff & Berridge, PLC

(57) ABSTRACT

A printer driver for holding the setting of various parameters for a printer and effecting conversion of print data from an application, the printer driver includes: a specific character string detecting unit which detects from the print data a specific character string designated by a user; a code converting unit which converts the specific character string detected by the specific character string detecting unit to a code; and a code imparting unit which imparts the code converted by the code converting unit to the print data.

15 Claims, 19 Drawing Sheets

PRINTER, PRINTER DRIVER, PRINTING SYSTEM, AND PRINT CONTROLLING METHOD

BACKGROUND OF THE INVENTION

1. Field of the Invention

The present invention relates to a printer, a printer driver, a printing system and a print controlling method, and more particularly to a printer, a printer driver, a printing system and a print controlling method for converting a specific character string contained in print data to a two-dimensional code and printing the converted two-dimensional code together with the print data or for printing a two-dimensional code that the converted two-dimensional code can be read surely by a reading device regardless of the performance of an output printer or a print mode.

2. Description of the Related Art

In recent years, a two-dimensional code which remarkably improves the display of an amount of information as compared with a one-dimensional bar code has come to attract attention, and has begun to be used.

In contrast to the fact that the one-dimensional bar code is basically used as an identification (ID) code of merchandise or a product, the two-dimensional code is able to allow the code itself to be provided with information concerning merchandise or a product. Hence, if a two-dimensional code is imparted to the merchandise or the like, and the two-dimensional code imparted to the merchandise is read by a reader, it is possible to instantly read information concerning an item number and the merchandise which are allotted correspondingly to the two-dimensional code.

In contrast to the fact that, in the one-dimensional bar code, the bar code is displayed vertically or horizontally in a row, two-dimensional codes include a stack-type two-dimensional code in which one-dimensional bar codes are stacked in a plurality of stages and a matrix-type two-dimensional code which is encoded depending on whether intersections of a matrix are black or white.

As examples of stack-type two-dimensional codes, it is possible to cite Code 49, Code 16K, PDF 417, and the like, and as examples of matrix-type two-dimensional codes, it is possible to cite QR code, Data Matrix, Maxicode, Aztec Code, and the like.

Since the two-dimensional code is able to display information having a capacity which is several dozen to several hundred times as large as a conventional one-dimensional bar code, various generating tools for generating two-dimensional codes have recently been provided.

However, with the existing QR code generating tools, when a QR code is generated by taking into consideration the resolution of a printer which prints the QR code, and the generated QR code is pasted to the print data created by application software such as word processing software and spreadsheet software, troublesome operation has been required for performing operation such that the QR code is pasted to the print data created by the application software as image data.

In addition, there is another problem in that the QR code cannot be pasted to the print data created by an application software to which image data cannot be pasted.

Accordingly, Japanese Patent Application Laid-Open No. 2002-264424 proposes a symbol printer and a driver for a symbol printer in which data (display data) to be displayed by a one-dimensional bar code or two-dimensional code symbol which is finally printed are received, and are converted to a predetermined symbol and printed.

However, although the above-described Japanese Patent Application Laid-Open No. 2002-264424 proposes a symbol printer which receives the display data, converts the received display data to a predetermined symbol, and prints them, but it does not propose a method in which a character string designated by a user is retrieved from the print data, is converted to a one-dimensional bar code or a two-dimensional code, imparts the converted code to the print data, and prints the print data together with the converted code.

In a case where a plurality of printers having different resolution are connected through a network, it is necessary to generate a code having a size and precision in accordance with the ability such as resolution of the printer of the destination such that the code printed by the printer of the destination can be read surely by a scanning device.

In a case where a toner saving mode for saving the used amount of toner of the printer of the destination is set, there is a possibility of a problem that the code printed out by the printer cannot be read by a scanning device because of its concentration deficiency or the like.

SUMMARY OF THE INVENTION

An aspect of the present invention provides a printer driver for holding a setting of various parameters for a printer and effecting conversion of print data from an application, the printer driver includes: a specific character string detecting unit which detects from the print data a specific character string designated by a user; a code converting unit which converts the specific character string detected by the specific character string detecting unit to a code; and a code imparting unit which imparts the code converted by the code converting unit to the print data.

Another aspect of the present invention provides a printer which receives print data from an application converted by a printer driver, and performs a print output of the print data, the printer includes: a specific character string detecting unit which analyzes the print data and detects from the print data a specific character string designated by a user; a code converting unit which converts the specific character string detected by the specific character string detecting unit to a code; a code imparting unit which imparts the code converted by the code converting unit to a designated position of the print data; and a detected-character-string color converting unit which converts a color of the specific character string corresponding to the code converted by the code converting unit to a color designated by the user or a color set automatically.

Still another aspect of the present invention provides a printer driver for holding a setting of various parameters for a printer and effecting conversion of print data from an application, the printer driver includes: a specific character string detecting unit which detects from the print data a specific character string designated by a user; a code converting unit which converts the specific character string detected by the specific character string detecting unit to a code; a code imparting unit which imparts the code converted by the code converting unit to the print data; and a toner saving prohibition control unit which selectively prohibits toner saving processing for the code imparted by the code imparting unit in a case where the printer has been set to a toner saving mode.

Yet another aspect of the present invention provides a printing system, which includes a printer driver for holding a setting of various parameters for a printer and effecting conversion of print data from an application and a printer for printing on the basis of print data from the printer driver, in which the printer driver includes: a specific character string detecting unit which detects a specific character string designated by a user from the print data; a code converting unit which converts the specific character string detected by the specific character string detecting unit to a code; a code imparting unit which imparts the code converted by the code converting unit to the print data; a code position information generating unit which generates position information of the code imparted to the print data by the code imparting unit; and a transmitting unit which imparts the code position information generated by the code position information generating unit to the print data and transmits it to the printer, and in which the printer includes a toner saving prohibition control unit which selectively prohibits toner saving processing for the code on the basis of the code position information in a case where a toner saving mode has been set.

Yet still another aspect of the present invention provides a print controlling method for printing print data on the basis of the print data from an application and setting information on various parameters for a printer, the method includes: detecting a specific character string designated by a user from the print data by a specific character string detecting unit; converting the specific character string detected by the specific character string detecting unit to a code by a code converting unit; imparting the code converted by the code converting unit to the print data by a code imparting unit; and selectively prohibiting by a toner saving prohibition control unit toner saving processing for the code imparted by the code imparting unit in a case where a toner saving mode has been set.

BRIEF DESCRIPTION OF THE DRAWINGS

Embodiments of the present invention will be described in detail based on the following figures, wherein.

DETAILED DESCRIPTION OF THE INVENTION

Hereafter, referring to the accompanying drawings, a detailed description will be given of an embodiment of a printer, a printer driver, a printing system and a print controlling method in accordance with the invention.

Figure 1:
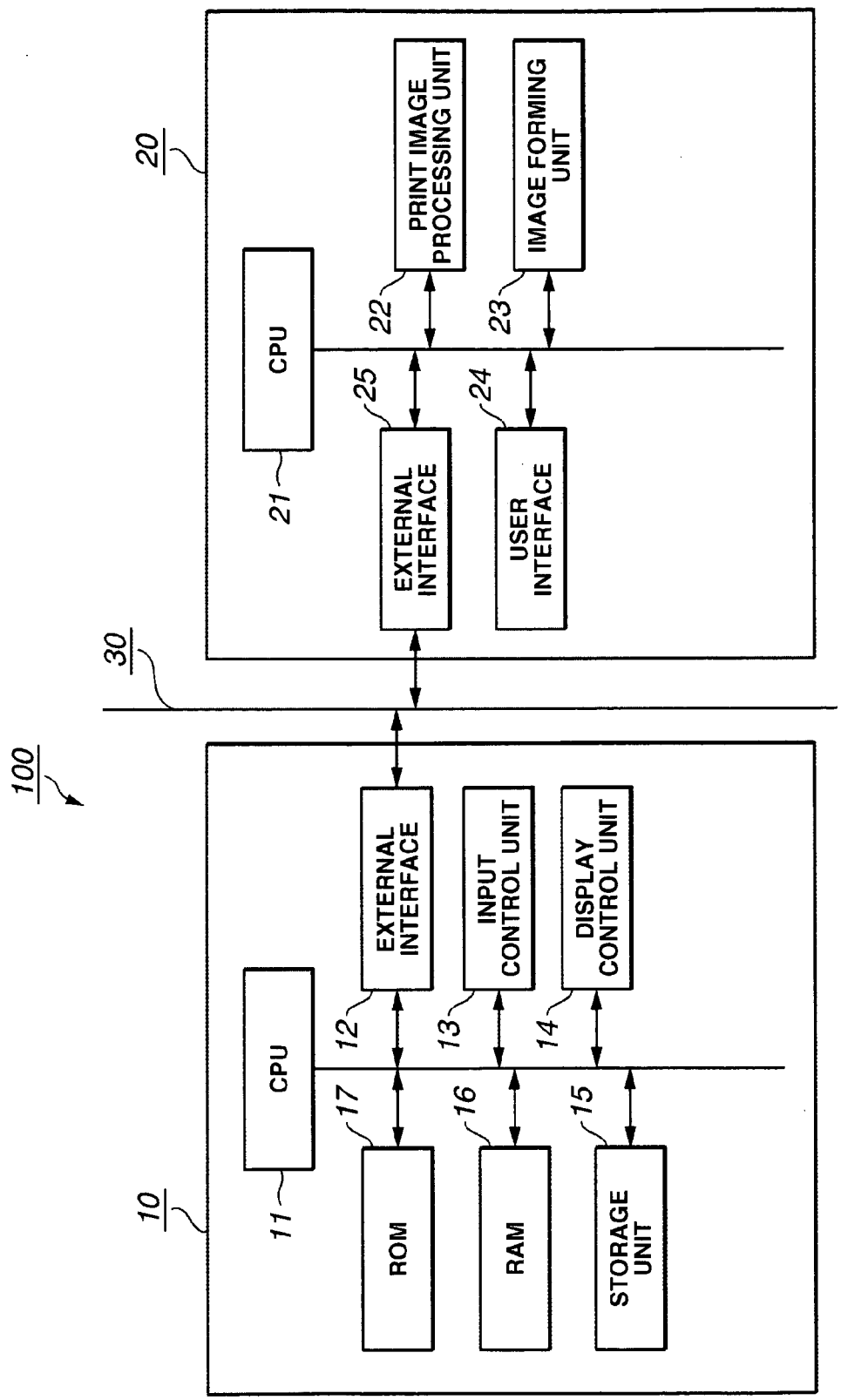
FIG. 1 is a schematic diagram illustrating an example of a printing system to which a printer driver and a controlling method thereof in accordance with the invention are applied.

FIG. 1 is a schematic diagram illustrating an example of a printing system to which a printer, a printer driver, and a controlling method thereof in accordance with the invention are applied.

As shown in FIG. 1, in a printing system 100, a client PC 10 and a printer 20 are connected through a network such as a LAN (local area network).

The client PC 10 is a so-called computer having a CPU (central processing unit), input/output devices, a storage device, and the like, and specifically includes a CPU 11, an external interface 12, an input control unit 13, a display control unit 14, a storage unit 15, a ROM (read only memory) 16, and a RAM (random access memory) 17.

The CPU 11 is the central processing unit of the client PC 10, and controls the computer in accordance with a program stored in the ROM 17.

The external interface 12 performs transmission and reception of such as dada signals and control signals between the client PC 10 and an external device (e.g., the printer 20 connected thereto through the LAN 30).

The input control unit 13 performs input control of an operation signal by an input device such as an unillustrated keyboard, a mouse, or the like connected to the client PC 10.

The display control unit 14 controls the transmission and reception of such as dada signals and control signals by an unillustrated display device (e.g., a CRT display, a liquid crystal display, or the like) connected to the client PC 10.

The storage unit 15 is a storage device and has stored therein a printer driver 153 (details of which will be described later) in accordance with the invention, application software 152 (various application programs such as word processing software and spreadsheet software), an OS (operating system) 151 for performing system control of the client PC 10, and the like.

The printer driver 153 in accordance with the invention is configured so as to convert to a one-dimensional bar code or a two-dimensional code specific character strings included in the print data (referred to as "document print data" for the sake of description) created by the application software 152 on the client PC 10, and to be able to print the converted code together with the print data through the printer 20 connected to the client PC 10.

It should be noted that, in this embodiment, the code generated by converting the character string by the printer driver 153 will be described by taking as an example a QR (quick response) code which is one of two-dimensional codes.

In addition, the application software 152 is a program installed in advance on the client PC 10 by a user, and it is assumed that various application programs such as word processing software and spreadsheet software are installed.

The document print data transmitted from the client PC 10 to the printer 20 are created as the application software 152 stored in the storage unit 15 is read, and the application software 152 is executed by the CPU 11.

Specifically, in the case where the document print data are created by word processing software which is a kind of the application software 152, through an operating instruction by the user the CPU 11 reads the word processing software from the storage unit 15 and execute its, the document print data are created as desired print data are entered by the user.

In addition, in the case where specific character strings contained in the document print data are converted to the QR code, and the converted code is printed together with the print data, the user carries out predetermined setting on a predetermined setting screen of the printer driver 153, which, in turn, causes the printer driver 153 to convert to the QR code the specific character strings contained in the print data created by word processing software or the like and transfer the print data containing the QR code to the printer 20 through the external interface 12.

On the other hand, the printer 20 is a printer capable of color printing, and includes a CPU (central processing unit) 21, a print image processing unit 22, an image forming unit 23, a user interface 24, and an external interface 25.

The CPU 21 of the printer 20 controls various units of the printer 20 and the respective interfaces 24 and 25 and exercises supervisory control of the printer 20 as a whole.

The print image processing unit 22 provides predetermined image processing with respect to the print data and output the print data subjected to image processing to the image forming unit 23, so that the print data, for which a print instruction has been given, will be formed on printing paper in the image forming unit 23.

It should be noted that the print data for which a print instruction has been given includes the case of only the document print data and the case of the document print data containing the QR code.

On the basis of the print data outputting by the print image processing unit 22 after image processing, the image forming unit 23 forms character information and image information corresponding to the document print data, as well as the QR code, on the printing paper, and outputs the same.

The user interface 24 is configured by an operating portion such as buttons for performing various setting operations of the printer 20 and the operation of selecting various processing by the user's operation, as well as a display portion for displaying a display screen, and is able to perform the display of desired information and print selecting operation as the user operates the operating portion.

The external interface 25 performs transmission and reception of data and control signals with the client PC 10 and external devices other than the printer 20 (hereafter, generally referred to as the "external devices") which are connected thereto through the LAN 30.

Figure 2:
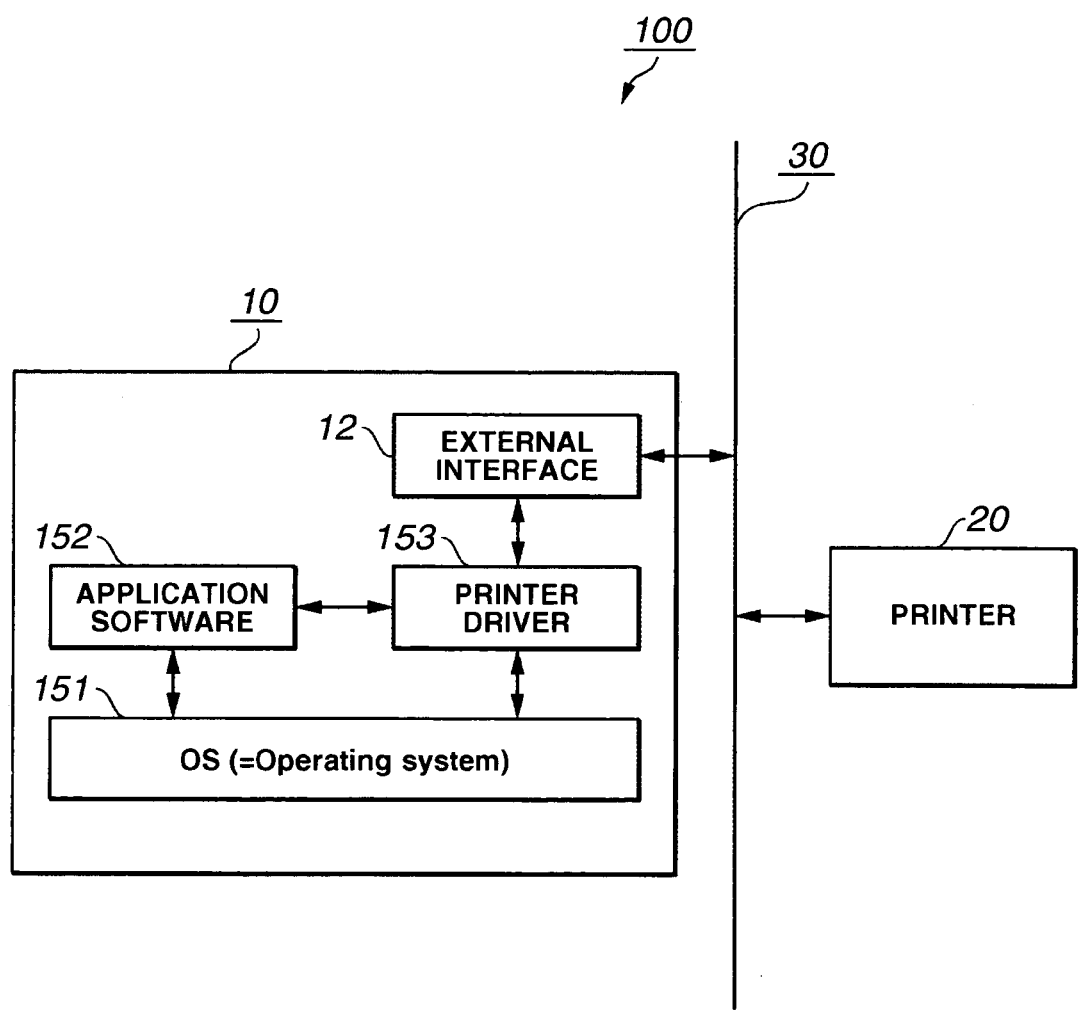
FIG. 2 is a diagram illustrating the configuration of software for performing various processing on a client PC 10.

FIG. 2 is a schematic diagram for explaining the configuration of software for performing various processing on the above-described client PC 10.

As shown in FIG. 2, the OS 151, the printer driver 153, and the application software 152 are installed on the client PC 10, and the OS 151 controls the operation of the printer driver 153 and the application software 152.

As a print instruction is given, the document print data created by the application software 152 are transmitted through the printer driver 153 and the printer driver 153 on the client PC 10, and are transferred to the printer 20 through the LAN 30.

The printer driver 153 in accordance with the invention is configured so as to be able to perform the following print control in correspondence with the printer 20 connected to the client PC 10 on which the printer driver 153 has been installed.

The printer driver 153 in accordance with the invention is further configured so as to be able to convert to the QR code the character string designated by the user in the document print data created by the application software 152, and transmit to the printer 20 the document print data with the converted QR code imparted thereto.

The printer driver 153 in accordance with the invention is further configured so as to be able to convert the color of the character string converted to the QR code in the document print data to a color designated by the user or to an automatically set color, and transmit to the printer 20 the document print data containing the character string in the converted color and having the QR code imparted thereto.

The printer driver 153 in accordance with the invention is further configured so as to be able to transmit to the printer 20 the document print data with the QR code imparted thereto, so that the QR code converted from the character string designated by the user in the document print data can be printed at a designated position with respect to the character string before conversion designated by the user.

The printer driver 153 in accordance with the invention is further configured so as to be able to print by an arbitrary designation the size of the QR code converted from the character string designated by the user in the document print data, and to automatically set a parameter value of an error correction level of the QR code in correspondence with the arbitrarily designated size.

The printer driver 153 in accordance with the invention is further configured such that even if the font of the document print data is not installed on the printer 20, the application software transmits character information not in the form of bit map data but in the form of the character code as character data.

Figure 3:
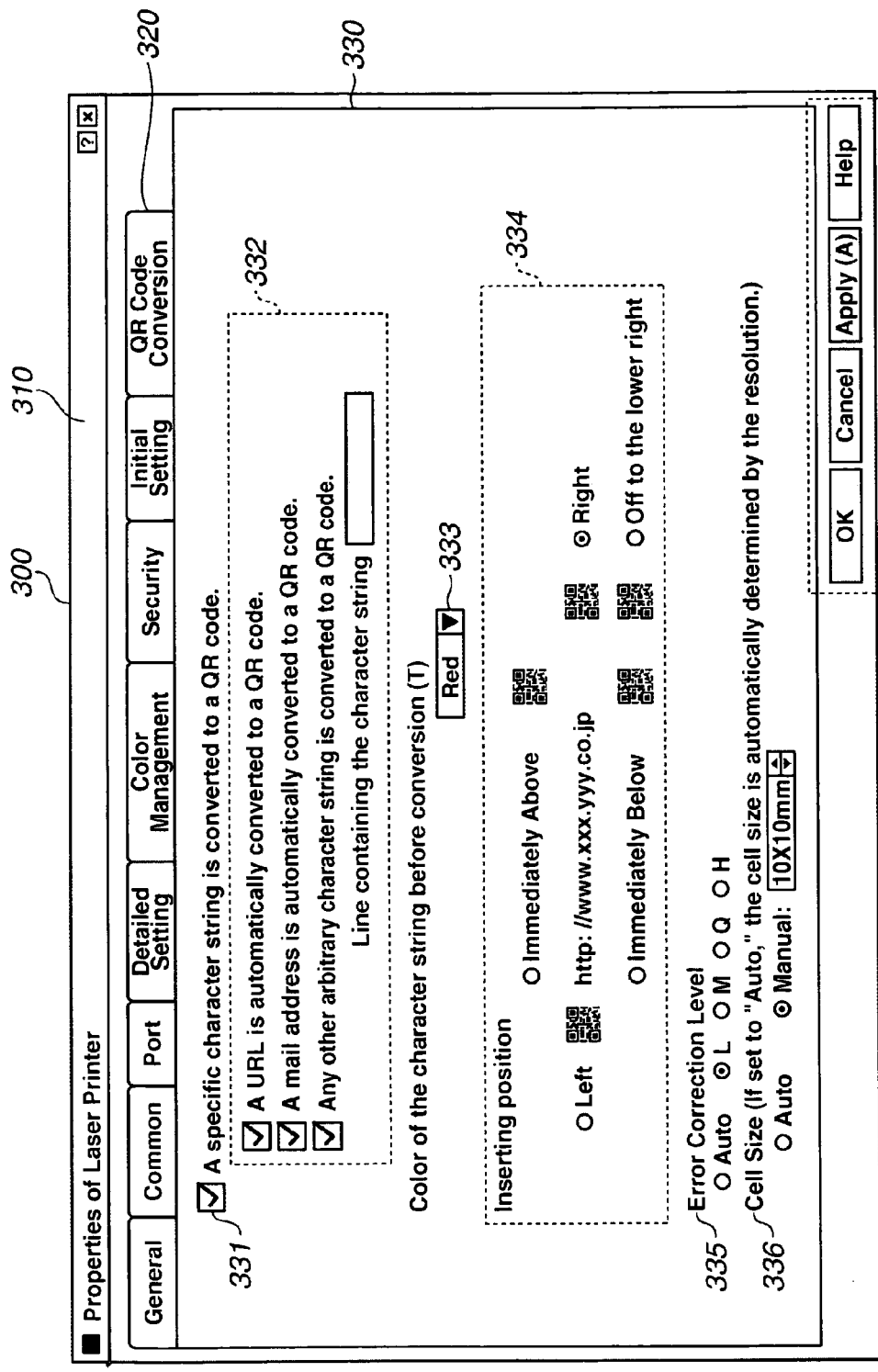
FIG. 3 is a diagram illustrating an example of a setting screen of a printer driver 153 in accordance with the invention.
Figure 4:
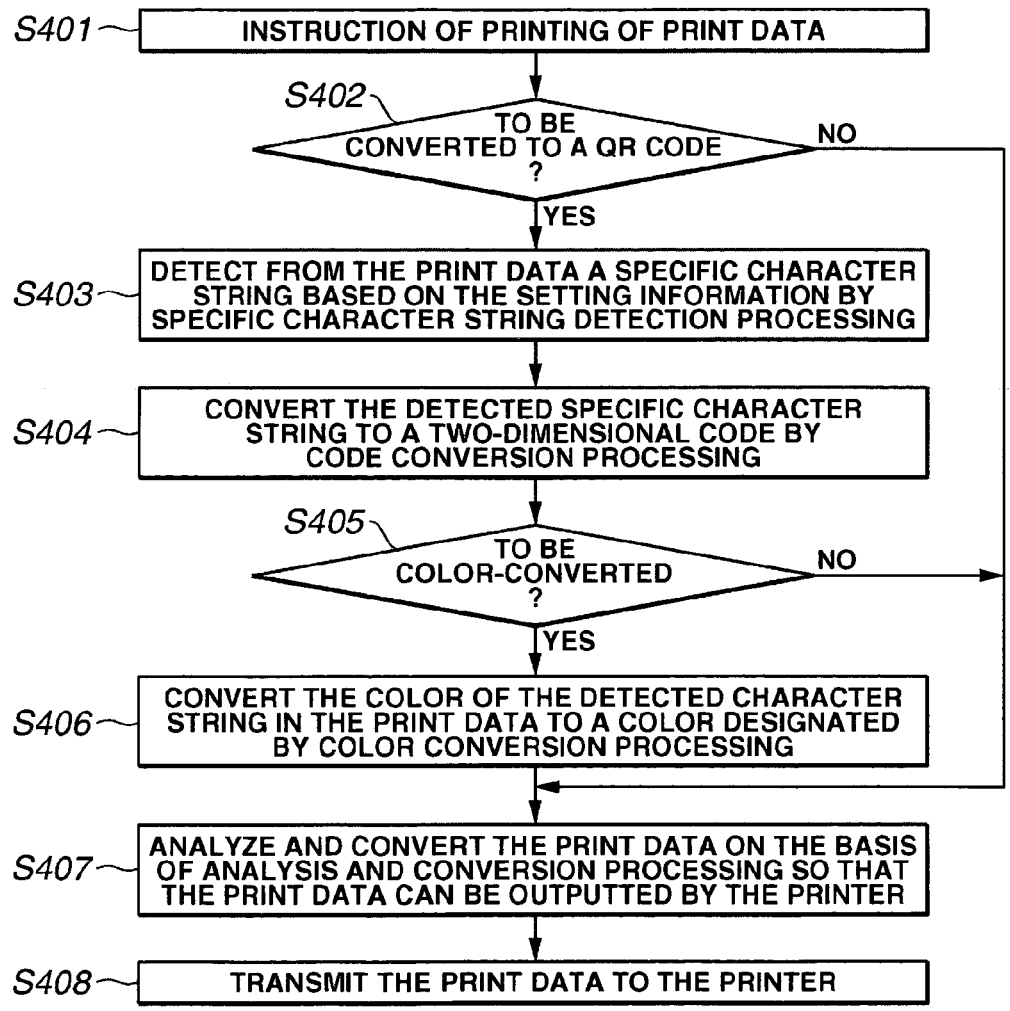
FIG. 4 is a flowchart of print control by the printer driver 153 on the basis of setting information set on a QR code conversion setting screen 300.
Figure 5:
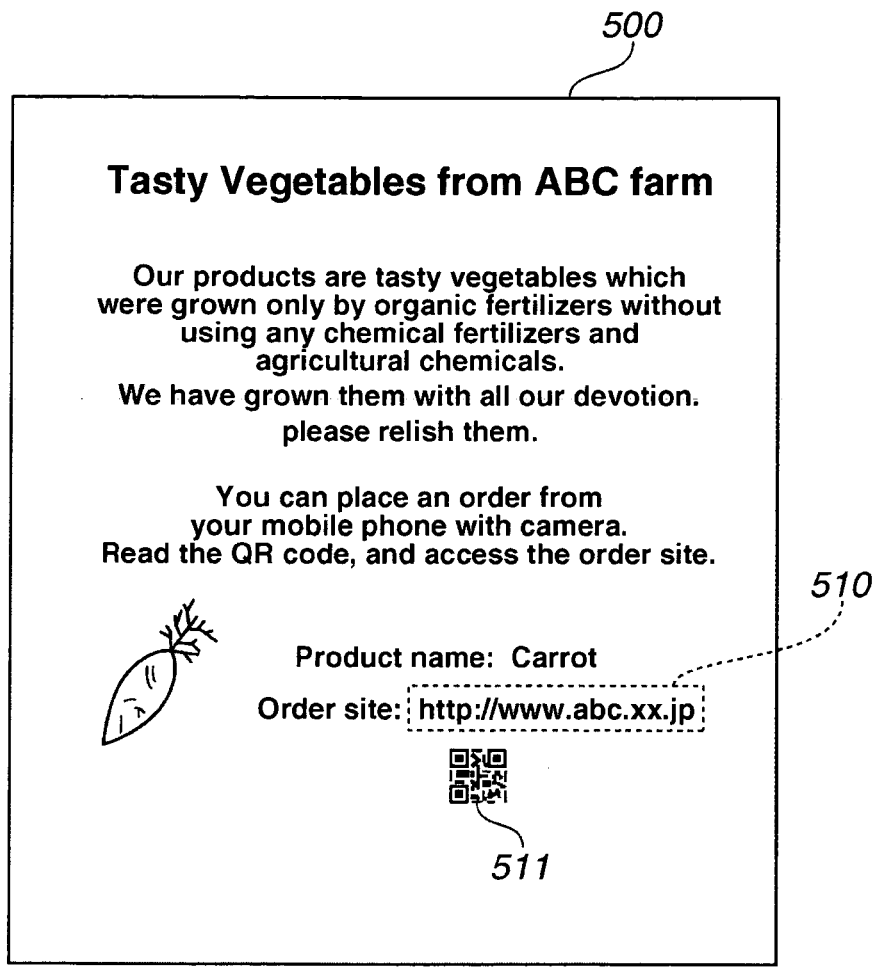
FIG. 5 is a diagram illustrating an example of printed matter 500 printed on the basis of setting information set on the QR code conversion setting screen 300.

Referring to FIGS. 3 to 5, a description will be given of the print control performed by the printer driver 153 thus configured, on the basis of the setting information set on the setting screen of the printer driver 153.

FIG. 3 is a diagram illustrating an example of the setting screen of the printer driver 153 in accordance with the invention.

It should be noted that FIG. 3 shows an example of the setting screen which is displayed when a QR code conversion tab is selected among a plurality of setting screens of the printer driver 153 in the case where printing is effected by converting a specific character string contained in the document print data to a QR code.

As shown in FIG. 3, a setting screen 300 for QR code conversion (hereafter referred to as the "QR code conversion setting screen 300") consists of a title bar 310; a plurality of tabs 320 respectively corresponding to a plurality of setting screens for performing various settings of the printer driver 153; a setting item setting section 330 for effecting various settings for QR code conversion, and designating operation buttons 340 (portion surrounded by the broken line) for effecting the designating operation of the setting, cancellation, application, help, and the like of various values and the selected set values which have been set in the setting item setting section 330. A title reading "Properties of Laser Printer" is displayed on the title bar 310 in correspondence with the printer 20 of the laser printer connected to the client PC 10.

On the QR code conversion setting screen 300, it is possible to effect the setting for converting the user-designated character string to the QR code with respect to the document print data created by the application software 152 or the like. The setting item setting section 330 includes a QR code conversion setting item 331 for selecting and setting whether or not to convert the document print data to a QR code; a character string designating item 332 (portion surrounded by a broken line) for designating a character string to be converted to a QR code in a case where the document print data are converted to the QR code; a color conversion setting item 333 for selecting whether or not printing is to be effected by converting the color of the character string converted to the QR code in the document print data to a user-designated color, and for designating the color; a QR code printing position setting item 334 (portion surrounded by a broken line) for designating a position for printing the QR code with respect to the designated character string in the document print data; an error correction level selecting and designating item 335 for selecting and designating an error correction level of the QR code to which the character string is converted; and a cell size selecting and designating item 336 for setting the cell size of the QR code.

In the character string designating item 332, it is possible to select any or all of "A URL is automatically converted to a QR code," "A mail address is automatically converted to a QR code," and "Any other arbitrary character string is converted to a QR code." In a case where "Any other arbitrary character string is converted to a QR code" is selected, the user effects setting by entering an arbitrary character string to be converted to the QR code.

If "A URL is automatically converted to a QR code" has been selected and set, the character string of the URL in the document print data is converted to the QR code; if "A mail address is automatically converted to a QR code" has been selected and set, the character string of the mail address in the document print data is converted to the QR code; and if "Any other arbitrary character string is converted to a QR code" has been selected and set, all the character strings of the line containing the user-designated character string in the document print data are converted to the QR code.

Further, the converted QR code is printed by being allocated to any one of the positions of "Immediately Above," "Immediately Below," "Left," "Right," and "Off to the lower right" which has been selected and set in the QR code printing position setting item 334 with respect to the position of the character string before conversion.

The error correction level selecting and designating item 335 and the cell size selecting and designating item 336 are items for selecting and setting the error correction level of the QR code and the cell size at the time of QR code conversion. As the error correction level of the QR code, it is possible to set four levels of L, M, Q, and H, and the error correction capability improves in the order of level L, M, Q, and H. The level L is the lowest in the error correction capability, and the level H is the highest in the error correction capability.

At the time of converting the character string to the QR code, if "Auto" has been selected and set in the error correction level selecting and designating item 335, an optimum error correction level (any one of L, M, Q, and H) corresponding to the resolution of the printer 20 is automatically determined, and the character string is converted to the QR code at the determined error correction level. If one of the error correction levels L, M, Q, and H has been selected and set, the character string is converted to the QR code at the set error correction level (any one of L, M, Q, and H).

On the other hand, if "Auto" has been selected and set in the cell size selecting and designating item 336, an optimum size of the QR code corresponding to the resolution of the printer 20 is automatically determined, and the character string is converted to the QR code of the determined size. If a value of the cell size has been selected and set, the character string is converted to the QR code of the set size.

It should be noted that check marks or dots, as well as data such as character strings and numerical values, are displayed for the items selected among the selection setting items.

Referring to FIG. 4, a description will be given of the operation of print control of the printer driver 153 on the basis of the setting information set on the QR code conversion setting screen 300 thus configured.

As shown in FIG. 4, upon receiving a print instruction and the document print data (Step S401), the printer driver 153 determines whether or not to convert a specific character string to a QR code with respect to the relevant document print data on the basis of the setting information which has been set on the QR code conversion setting screen 300 (Step S402).

If "A specific character string is converted to a QR code" has been set in the QR code conversion setting item 331 on the QR code conversion setting screen 300 (YES in Step S402), a determination is made by specific character string detection processing as to whether any or all of "A URL is automatically converted to a QR code," "A mail address is automatically converted to a QR code," and "Any other arbitrary character string is converted to a QR code" have been selected. Character strings corresponding to the selected items are extracted from the document print data, and are stored in the storage unit 15 (Step S403).

Specifically, if "A URL is automatically converted to a QR code" has been set, the document print data are scanned, and a character string corresponding to the URL, e.g., a character string which starts with "http://" until the detection of null data or space data, is extracted as the character string data of the URL.

In addition, if "A mail address is automatically converted to a QR code" has been set, character string data corresponding to the mail address are retrieved and extracted in the same way as the aforementioned URL.

In addition, if "Any other arbitrary character string is converted to a QR code" has been set, in a case where a character string, e.g., "ABCDEF," has been inputted and set by the user, a determination is made as to whether or not a line containing "ABCDEF" in the document print data is present, and if it is present, all the character string data of that line are extracted.

The character string data extracted by specific character string detection processing (hereafter referred to as the "specific character string data") are temporarily stored in the RAM 16, and are converted to the QR code by code conversion processing (Step S404).

In the code conversion processing, the specific character string data are converted to image data in the QR code on the basis of the respective setting information on the error correction level (any one of Auto, L, M, Q, and H) set in the error correction level selecting and designating item 335 and the setting information (either Auto or the cell size set by the user) set in the cell size selecting and designating item 336 on the QR code conversion setting screen 300. The converted QR code is imparted to the document print data so as to be printed at a position corresponding to the insertion position information (any one of "Immediately Above," "Immediately Below," "Left," "Right," and "Off to the lower right" with respect to the specific character string) set in the QR code printing position setting item 334.

For example, if "Left" has been selected and set in the QR code printing position setting item 334, the QR code is imparted to the document print data so that the QR code is printed on the left side of the position of the character string before conversion (hereafter referred to as the "specific character string") of the QR code in the document print data.

After the specific character string data are converted to the QR code by the code conversion processing, and the converted QR code is imparted to the document print data, on the basis of setting information a determination is made as to whether or not the color of the specific character string before conversion of the QR code in the document print data is to be converted to a user-designated color or an automatically set color (Step S405). If the setting is provided to convert the color of the specific character string in the document print data to the designated color or the automatically set color (YES in Step S405), the color of the specific character string in the document print data is converted to the color set by the color conversion processing (Step S406).

In the color conversion processing, processing is provided for converting the color of the specific character string in a specific area of the document print data to a user-designated color or an automatically set color, on the basis of the position information on the specific character string specified when the specific character string data are extracted from the document print data in the specific character string detection processing.

As for the QR code and the document print data containing the specific character string color-converted to the user-designated color or the automatically set color by the color conversion processing in Step S406, the QR code and the document print data in which the specific character string has not been color-converted in the case where the answer is NO in Step S405, or the QR code and the respective document print data in the document print data to which the QR code has not been imparted in the case where the answer is NO in Step S402, such print data are subjected to predetermined image processing by print data analysis and conversion processing, so that the printer 20 can interpret and print out the received print data (Step S407). Subsequently, the document print data subjected to the image processing or the document print data containing the QR code are transmitted to the printer 20 (Step S408), and are printed on printing paper by the printer 20.

In Step S407, in a case where the document print data has been created by a font which is not installed on the printer 20, the character data from the application software 152 are normally transmitted to the printer driver in the form of bit map data. In such a case, however, there is a problem in that the printer driver is impossible to detect specific characters.

Accordingly, the printer driver 153 in accordance with the invention is so arranged that the font is made to appear to the application software 152 as if it is a font installed on the printer 20, so that the character data can be received by the character codes, thereby ensuring that the specific characters can be detected reliably.

In this case, after the font information installed on the printer 20 is acquired and held in advance, or the font information is acquired from the printer 20 of the destination, a determination is made as to whether or not the font of the document print data received from the application software 152 is installed on the printer 20. If the font of the document print data is not installed on the printer 20, the character information of the document print data is converted to the character codes of the font installed on the printer 20.

As for the printed matter printed on the printing paper by the printer 20, as shown in printed matter 500 in FIG. 5, a character string 510 (the character string surrounded by the broken line) of the URL in the print data is outputted in the "red" color set in the color conversion setting item 333 on the QR code conversion setting screen 300. A QR code 511 is converted to image data of the QR code at the error correction level "L" with a cell size of 10×10 mm in correspondence with the setting information respectively selected and set in the error correction level selecting and designating item 335 and the cell size selecting and designating item 336. The converted QR code 511 is printed immediately below the character string of the URL in correspondence with the setting information selected and set in the QR code printing position setting item 334.

Thus, the printer driver 153 in accordance with the invention converts a specific character string in the document print data to the QR code on the basis of the setting information set on a predetermined setting screen (QR code conversion setting screen 300) of the printer driver 153, and transmits the document print data containing the QR code. Therefore, it is possible to print the document print data containing the QR code without imparting a load in the processing of converting the character string to the QR code to the printer 20.

In the foregoing description, an example has been shown in which the printer driver 153 converts a specific character string in the document print data to the QR code on the basis of the setting information set on a predetermined setting screen, and transmits the document print data containing the QR code to the printer 20. However, a configuration may be adopted in which the CPU 21, which is a controller of the printer 20, converts a specific character string in the document print data to the QR code on the basis of the setting information set on a predetermined setting screen, and prints the document print data containing the QR code.

Figure 6:
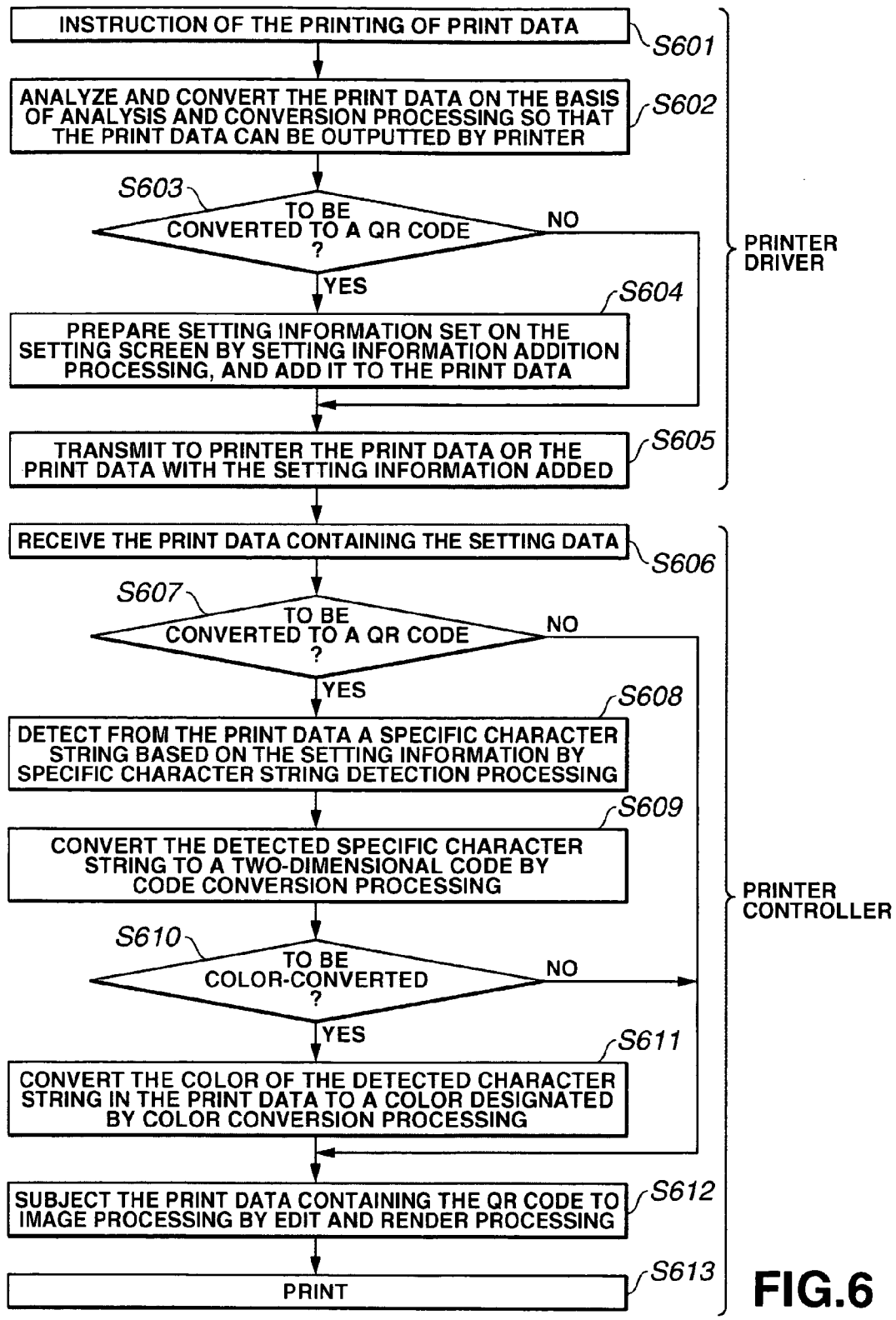
FIG. 6 is a flowchart of print control in a case where a printer controller converts a specific character string in document data to a QR code and outputs it.

FIG. 6 is a flowchart illustrating the operation of print control of the printer driver and the controller of the printer in a case where a configuration is adopted in which the controller (CPU 21) of the printer 20 converts a specific character string in the document print data to the QR code on the basis of the setting information set on a predetermined setting screen, and prints the document print data containing the QR code.

It should be noted that the printer driver, the printer, and the printer controller in this configuration are configured by replacing the printer driver 153, the printer 20, and the CPU 21 (controller) in the printing system 100 and the software configuration shown in FIGS. 1 and 2 with a printer driver 163, a printer 200, and a printer controller 210.

As shown in FIG. 6, upon receiving the document print data created by the application software 152 as a result of a print instruction (Step S601), the printer driver 163 effects predetermined image processing with respect to the received document print data by print data analysis and conversion processing, so that the print data can be printed by the printer 200 (Step S601).

After the image processing of the document print data by the print data analysis and conversion processing, a determination is made as to whether or not a setting for converting a specific character string in the document print data to the QR code has been made in the setting information set on the QR code conversion setting screen 300 (Step S603). If the setting for conversion to the QR code has been made (YES in Step S603), the data on the setting information set on the QR code conversion setting screen 300 (hereafter referred to as the "setting information data") are created, are imparted to the document print data subjected to image processing by the print data analysis and conversion processing (Step S604), and are transmitted to the printer 200 (Step S605).

Meanwhile, upon receiving the document print data to which the setting information data transmitted from the printer driver 153 have been imparted, the printer controller 210 of the printer 200 determines whether or not the setting for converting a specific character string in the document print data to the QR code has been made by referring to the setting information data (Step S607).

If it is determined in Step S607 that the setting for conversion to the QR code has been made (YES in Step S607), a determination is made as to whether any or all of "A URL is automatically converted to a QR code," "A mail address is automatically converted to a QR code," and "Any other arbitrary character string is converted to a QR code" have been selected. Character strings corresponding to the selected items are retrieved and extracted from the document print data by specific character string detection processing (Step S608).

The specific character string data extracted from the document print data by specific character string detection processing are converted to the QR code on the basis of the error correction level and the setting information on the cell size by code conversion processing, and the converted QR code is imparted to the document print data so that the converted QR code is printed at the position based on the setting information on a designated insertion position (Step S609).

After the specific character string data are converted to the QR code in the code conversion processing, and the converted QR code is imparted to the document print data, on the basis of the setting information a determination is made as to whether or not the color of the specific character string in the document print data is to be converted to a user-designated color or an automatically set color (Step S610). If the setting for converting a specific character string in the document print data to a designated color has been made in the setting information (YES in Step S610), the specific character string in the document print data is converted to the designated color by color conversion processing (Step S611).

As for the QR code and the document print data containing the specific character string converted to the user-designated color or the automatically set color by the color conversion processing in Step S611, the QR code and the document print data in which the specific character string has not been color-converted in the case where the answer is NO in Step S610, or the QR code and the respective document print data in the document print data to which the QR code has not been imparted in the case where the answer is NO in Step S607, such print data are subjected to predetermined image processing by print data analysis and conversion processing, so that the document print data and the QR code can be printed by the printer 200 (Step S612). Subsequently, the document print data subjected to the image processing or the document print data containing the QR code are printed on the printing paper.

Figure 7:
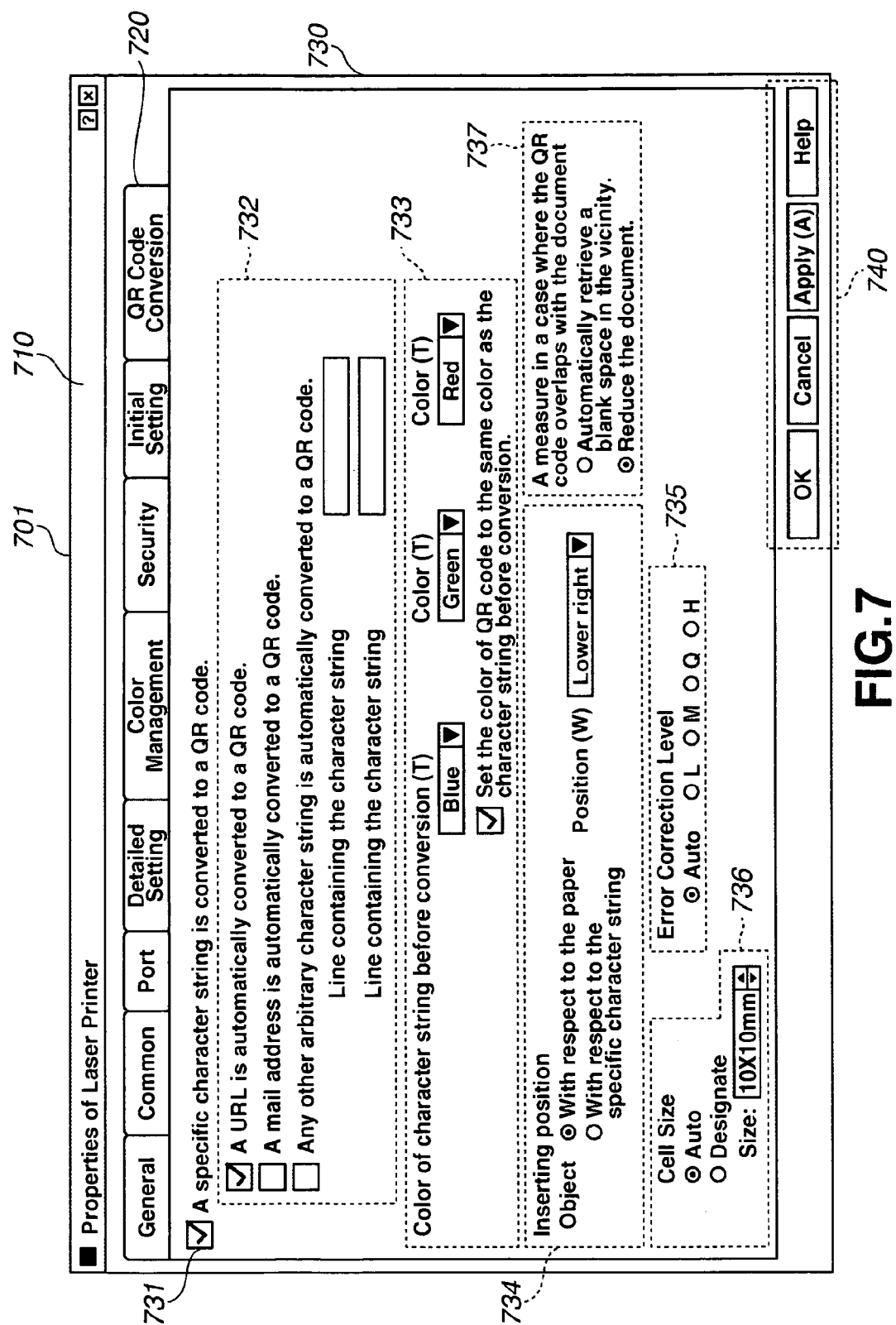
FIG. 7 is a diagram illustrating an example of a setting screen of a printer driver 173 different from the printer drivers 153 and 163.

FIG. 7 is a diagram illustrating an example of the setting screen of a printer driver 173 different from the above-described printer drivers 153 and 163.

The printer driver 173 in accordance with the invention is configured so as to be able to perform the following print control in addition to the print control performed by the printer drivers 153 and 163. The setting screen of the printer driver 173 has a screen configuration such as the one shown in FIG. 7 in correspondence with this configuration.

The printer driver 173 in accordance with the invention is configured so as to be able to convert the QR code and the specific character string converted to the QR code in the document print data to a user-designated color or an automatically set color, and transmit to the printer 20 the document print data containing the color-converted specific character string and having the color-converted QR code imparted thereto.

In addition, in a case where a plurality of specific character strings to be converted to QR codes are present in the document data, the printer driver 173 in accordance with the invention is configured so as to be able to set the color of a QR code and the color of the specific character string converted to that QR code to the same color, convert the color of another QR code and the color of the specific character strings converted to that QR code to different colors, and transmit to the printer 20 the document print data which contain the specific character strings converted to the plurality of colors and have the QR codes imparted thereto.

Further, in a case where the QR code overlaps with the document data (e.g., a character or an image) when the QR code converted from the user-designated character string is allocated to a user-designated position, the printer driver 173 in accordance with the invention is configured so as to be able to automatically retrieve and specify a blank portion of the document data and transmit to the printer the document data by allocating the QR code to the position of the specified blank portion.

Further, in the case where the QR code overlaps with the document data (e.g., a character or an image) when the QR code converted from the user-designated character string is allocated to a user-designated position, the printer driver 173 in accordance with the invention is configured so as to be able to automatically form a blank portion by reducing the area of the document data, and transmit to the printer the document data by allocating the QR code to the position of the specified blank portion thus formed.

Further, the printer driver 173 in accordance with the invention is configured so as to be able to impart the QR code to the document data and transmit them to the printer 20 so that the QR code converted from the user-designated character string can be printed at a position in a header area or a footer area.

Figure 8:
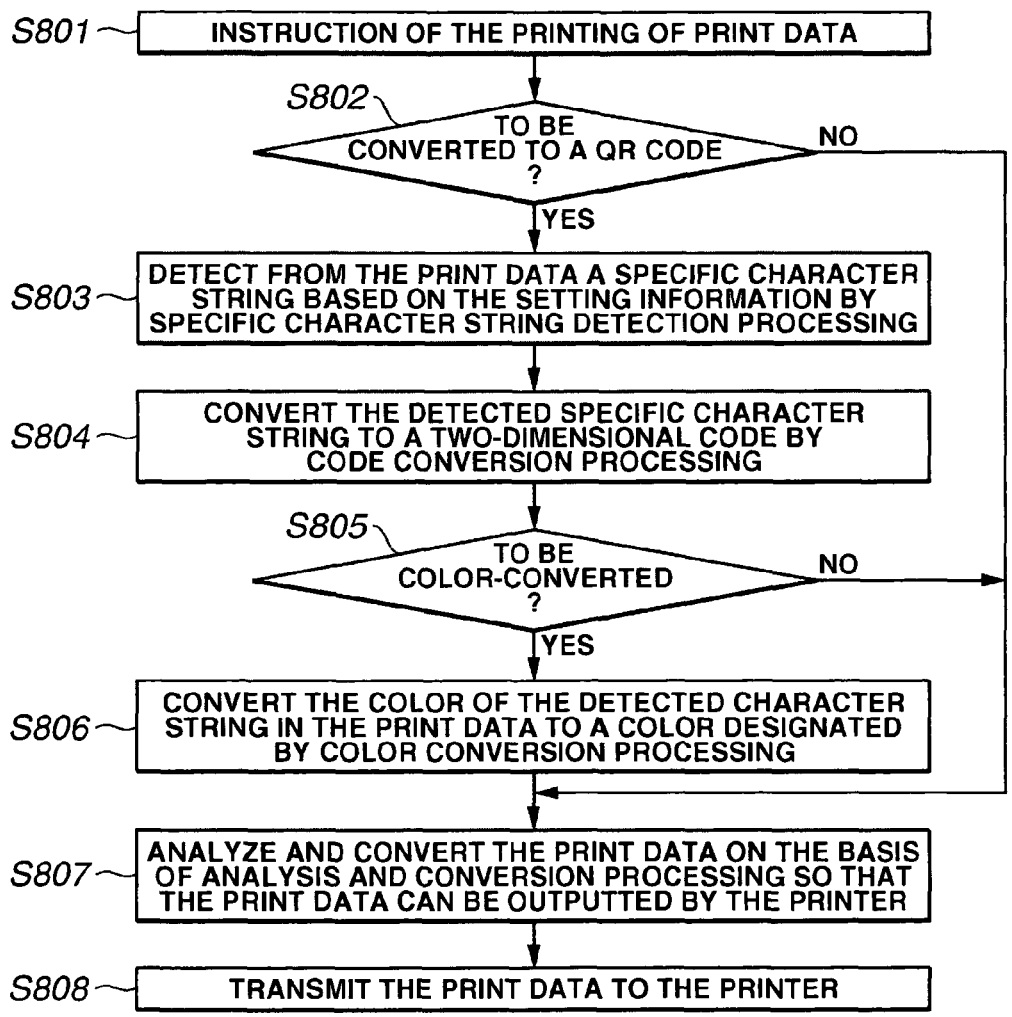
FIG. 8 is a flowchart of print control by the printer driver 173 on the basis of setting information set on a QR code conversion setting screen 700.

Referring to FIGS. 7 and 8, a description will be given of the print control of the printer driver 173 thus configured.

FIG. 7 is a diagram illustrating an example of the setting screen of the printer driver 173 in accordance with the invention, as described before. This setting screen shows an example of a QR code conversion setting screen 700 in which the printer driver 173 converts a specific character string contained in the document data to a QR code, and performs print control for printing the converted QR code and the document data.

As shown in FIG. 7, the QR code conversion setting screen 700 is configured in the same way as the QR code conversion setting screen 300 except for the following: The QR code conversion setting screen 700 is configured so as to be able to designate a plurality of arbitrary character strings in the selection item "Any other arbitrary character string is converted to a QR code" in a character string designating item 732 (portion surrounded by a broken line). The QR code conversion setting screen 700 is further configured so as to be able to color-designate a plurality of character strings before conversion in a color conversion setting item 733 (portion surrounded by a broken line) and to be able to designate whether or not the color of the QR code is to be set in the same color as the character string before conversion. The QR code conversion setting screen 700 is further configured so as to be able to select and set either "With respect to the paper" or "With respect to the specific character string" as the printing position of the QR code in a QR code printing position setting item 734. In the case where the document data and the QR code overlap when the QR code is printed at a position selected and set in the QR code printing position setting item 734 (portion surrounded by a broken line), the QR code conversion setting screen 700 is further configured so as to be able to automatically retrieve a blank space in the vicinity and print the QR code in that blank portion, or form a blank portion by outputting the document data in a reduced form. Furthermore, an overlapping printing measure setting item 737 (portion surrounded by a broken line) for selecting whether or not to print the QR code in that blank portion is newly provided.

Referring to FIG. 8, a description will be given of the operation of print control of the printer driver 173 on the basis of the setting information set on the QR code conversion setting screen 700 thus configured.

As shown in FIG. 8, upon receiving a print instruction and the document print data (Step S801), the printer driver 173 determines whether or not to convert a specific character string to a QR code with respect to the relevant document print data on the basis of the setting information which has been set on the QR code conversion setting screen 700 (Step S802). If "A specific character string is converted to a QR code" has been set in an QR code conversion setting item 731 on the QR code conversion setting screen 700 (YES in Step S802), a determination is made by specific character string detection processing as to whether any or all of "A URL is automatically converted to a QR code," "A mail address is automatically converted to a QR code," and "Any other arbitrary character string is converted to a QR code" have been selected. Character strings corresponding to the selected items are extracted from the document print data, and are stored in the storage unit 15 (Step S803).

The character string data extracted by specific character string detection processing are converted to the QR code by code conversion processing (Step S804).

In the code conversion processing, the specific character string data are converted to image data in the QR code on the basis of the respective setting information on the error correction level (any one of Auto, L, M, Q, and H) set in an error correction level selecting and designating item 735 (portion surrounded by a broken line) and the setting information (either Auto or the cell size set by the user) set in a cell size selecting and designating item 736 (portion surrounded by a broken line) on the QR code conversion setting screen 700. The converted QR code is imparted so as to be printed at a position corresponding to the insertion position information (any one of "Immediately Above," "Immediately Below," "Left," "Lower left," "Right," "Lower right," and the like with respect to the paper or the specific character string) set in the QR code printing position setting item 734.

For example, if "Lower right" and "With respect to the paper" have been selected and set in the QR code printing position setting item 734, the QR code is imparted to the document print data so that the QR code is printed at the lower right of the printing paper.

It should be noted that in the case where the QR code overlaps with the document data (e.g., a character or an image) when the QR code converted from the user-designated character string is allocated to the position set in the QR code printing position setting item 734, a blank portion in the vicinity of the set position or in the overall document data is retrieved, and the QR code is allocated to the position of the retrieved blank portion, or a blank portion is formed by reducing the area of the document data, and the QR code is allocated to the position of the blank portion thus formed.

In addition, the blank portion can be specified by referring to various setting information including the size of the document data, the size of the printing paper, and page setting information, and the like.

After the specific character string data are converted to the QR code by the code conversion processing, and the converted QR code is imparted to the document print data, on the basis of the setting information set in the color conversion setting item 733 a determination is made as to whether or not the color of the specific character string before conversion of the QR code in the document print data is to be converted to a designated color, or whether or not the color of the QR code is to be set to the same color as that of the character string before conversion (Step S805). If the setting is provided to convert the colors of the specific character string and the QR code to designated colors (YES in Step S805), the colors of the specific character string in the document print data and the QR code are converted to the colors corresponding to the setting information by the color conversion processing (Step S806).

In the color conversion processing, processing is provided for converting the colors of the specific character string in a specific area of the document print data and its QR code to user-designated colors or automatically set colors, on the basis of the position information on the specific character string specified when the specific character string data are extracted from the document print data in the specific character string detection processing.

In addition, in a case where a plurality of specific character strings to be converted to QR codes are present in the document data, processing is provided for setting the color of a QR code and the color of the specific character string converted to that QR code to the same color, and for converting the color of another QR code and the color of the specific character strings converted to that QR code to different colors.

As for the document print data containing the QR code and the specific character string color-converted to the color corresponding to the setting information by the color conversion processing in Step S806, the QR code and the document print data in which the specific character string has not been color-converted in the case where the answer is NO in Step S805, or the QR code and the respective document print data in the document print data for which the processing for conversion to the QR code is not effected in the case where the answer is NO in Step S802, such print data are subjected to predetermined image processing by print data analysis and conversion processing, so that the printer 20 can interpret and print out the received print data (Step S807). Subsequently, the document print data subjected to the image processing or the document print data containing the QR code are transmitted to the printer 20 (Step S808), and are printed on printing paper by the printer 20.

Figure 9:
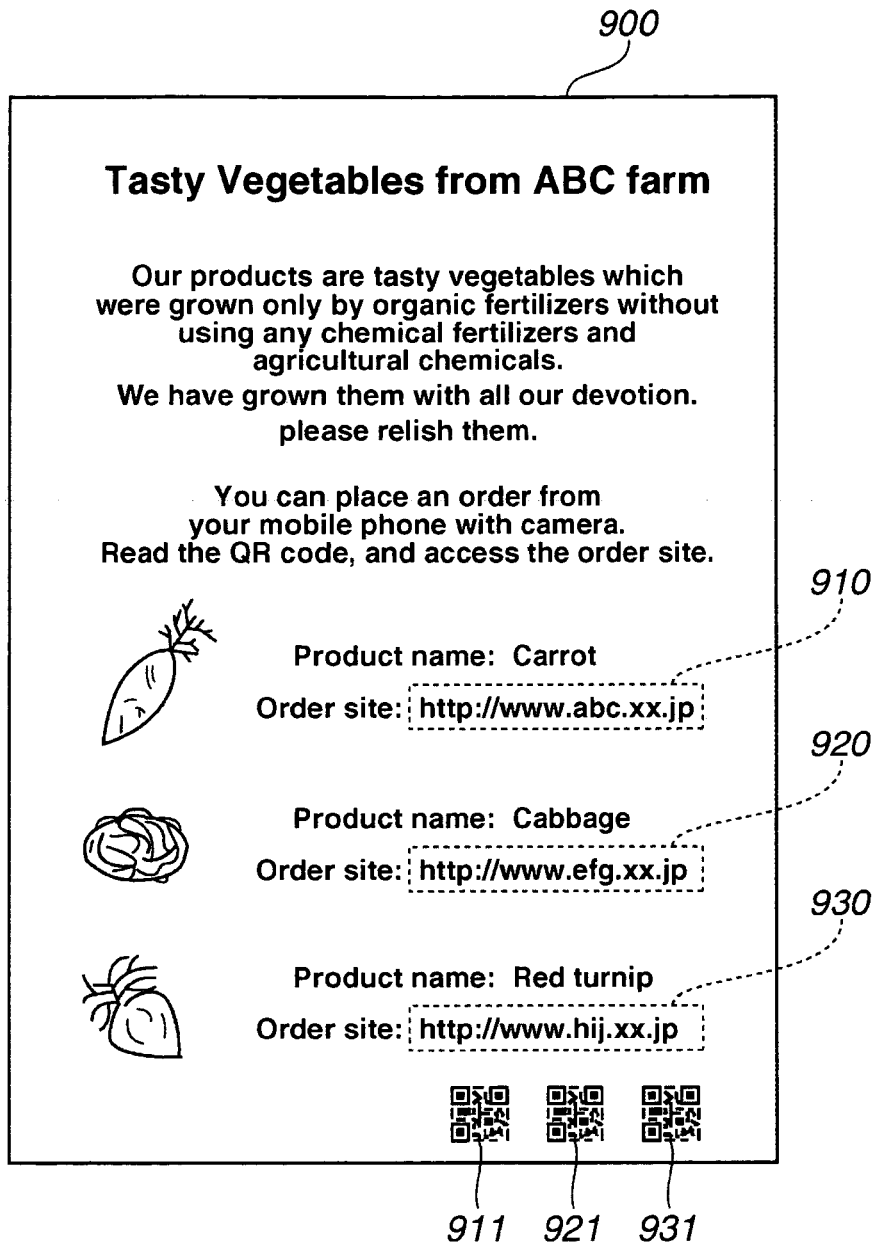
FIG. 9 is a diagram illustrating an example of printed matter 800 printed on the basis of setting information set on the QR code conversion setting screen 700.

As for the printed matter printed on the printing paper by the printer 20, as shown in printed matter 900 in FIG. 9, character strings 910, 920, and 930 (the character strings surrounded by the broken lines) of a plurality of URLs in the document print data are outputted in respective colors on the basis of the setting information concerning "Blue," "Green," and "Red" set in the color conversion setting item 733 on the QR code conversion setting screen 700. For instance, the character string 910 of the URL is outputted in the "Blue" color, the character string 920 of the URL in the "Green" color, and the character string 930 of the URL in the "Red" color. Meanwhile, as for QR codes 911, 921, and 931 corresponding to the character strings 910, 920, and 930 of the respective URLs, the QR code 911 is outputted in the "Blue" color, the QR code 921 in the "Green" color, and the QR code 931 in the "Red" color, respectively, on the basis of the setting information concerning "The color of QR code is set to the same color as the character string before conversion."

In addition, the respective QR codes 911, 921, and 931 are converted to those in which the error correction level and the cell size are set to optimum values based on the resolution of the printer 20 in correspondence with "Auto" selected and set in the error correction level selecting and designating item 735 and "Auto" selected and set in the cell size selecting and designating item 736. The converted QR codes 911, 921, and 931 are outputted at positions corresponding to "Lower left" "With respect to the paper" set in the QR code printing position setting item 734.

Figure 10:
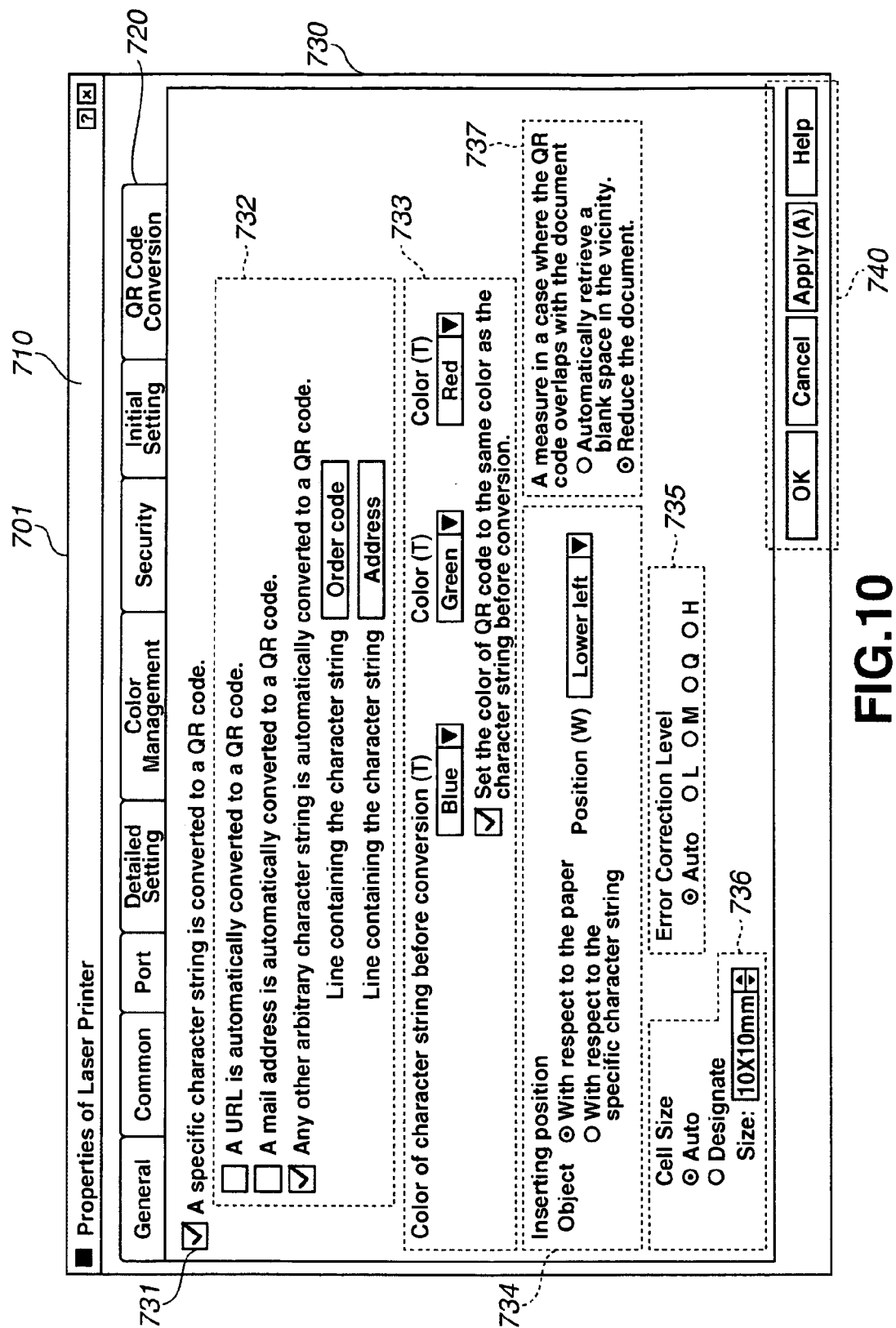
FIG. 10 is a diagram illustrating an example of the QR code conversion setting screen 700 in which set values different from those shown in FIG. 3 have been selected and set.

FIG. 10 is a diagram illustrating an example in which, on the QR code conversion setting screen 700 of the printer driver 173, "Any other arbitrary character string is automatically converted to a QR code" has been selected in the character string designating item 732, "Order code" and "Address" have been entered and set as arbitrary character strings, and "Lower left" "With respect to the paper" have been selected and set in the QR code printing position setting item 734.

Figure 11:
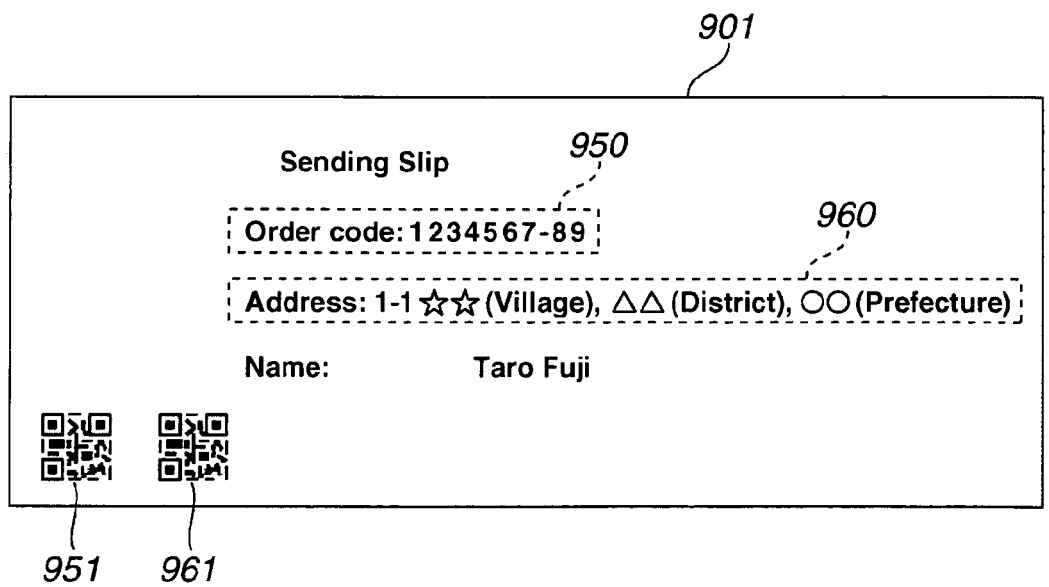
FIG. 11 is a diagram illustrating an example of printed matter 900 printed on the basis of setting information set on the QR code conversion setting screen 700.

In the case where such settings are provided, printed matter 901 such as the one shown in FIG. 11 is outputted by the print control by the printer driver 173.

As shown in FIG. 11, in the printed matter 901, all the character string data 950 of the line containing the order code and all the character string data 960 of the line containing the address in the document data are respectively converted to QR codes 951 and 961. The QR code 951 and all the character string data 950 containing the order code are outputted in the "Blue" color, and the QR code 961 and all the character string data 960 containing the address are outputted in the "Green" color, on the basis of the setting information concerning "Blue" and "Green" as well as "The color of QR code is set to the same color as the character string before conversion" set in the color conversion setting item 733. The QR codes 951 and 961 are converted to the QR codes 951 and 961 of image data based on "Auto" selected and set in the error correction level selecting and designating item 735 and "Auto" selected and set in the cell size selecting and designating item 736. The converted QR codes 951 and 961 are outputted at positions corresponding to "Lower left" "With respect to the paper" selected and set in the QR code printing position setting item 734.

Figure 12:
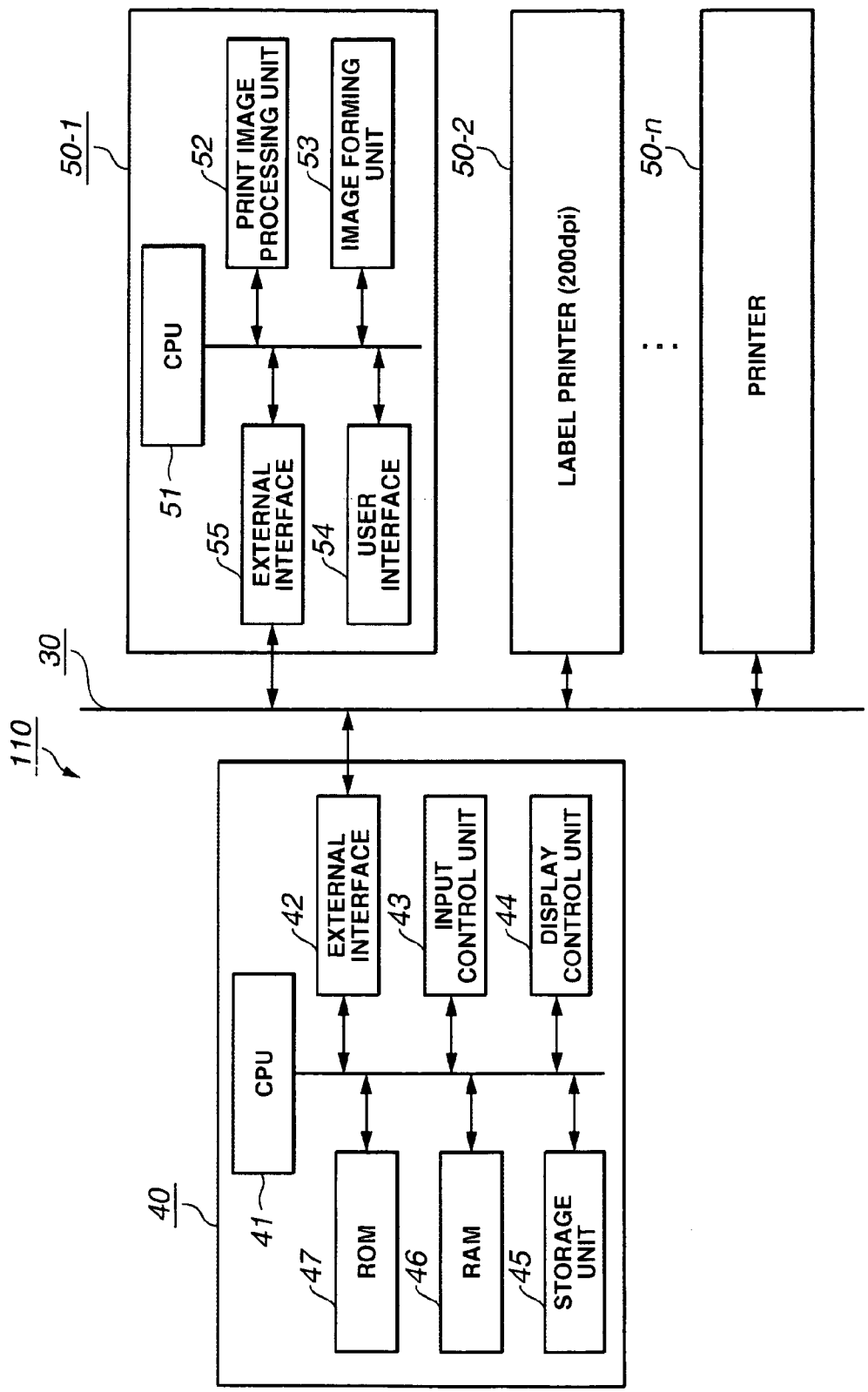
FIG. 12 is a schematic diagram illustrating an example of a printer driver, a printing system and a print controlling method in accordance with the invention.

FIG. 12 is a schematic diagram illustrating an example of a printer driver, a printing system and a print controlling method in accordance with the invention.

As shown in FIG. 12, in a printing system 110, a client PC 40, a plurality of printers 50-1 (e.g., resolution of 1200 dpi) having different resolution and the like, a label printer 50-2 (e.g., resolution of 200 dpi), . . . , a printer 50-*n* (hereinafter, generally referred to as the "printer 50-*n*") are connected through a network such as a LAN (=Local Area Network) 30.

The client PC 40 is a so-called computer provided with a CPU (central processing unit), input/output devices, a storage device, and the like, and specifically includes a CPU 41, an external interface 42, an input control unit 43, a display control unit 44, a storage unit 45, a RAM (random access memory) 46 and a ROM (read only memory) 47.

The CPU 41 is the central processing unit of the client PC 40 and exercises supervisory control of the client PC 40 in accordance with a program stored in the ROM 47.

The external interface 42 controls transmission and reception of such as dada signals and control signals between the client PC 40 and an external device (e.g., the printer 50-*n* connected thereto through the LAN 30).

The input control unit 43 performs input control of an operation signal by an input device such as an unillustrated keyboard, a mouse, or the like connected to the client PC 40.

The display control unit 44 controls the transmission and reception of such as dada signals and control signals by an unillustrated display device (e.g., a CRT display, a liquid crystal display, or the like) connected to the client PC 40.

The storage unit 45 is a storage device and has stored therein a printer driver 453 (details of which will be described later) in accordance with the invention, application software 452 (various application programs such as word processing software and spreadsheet software), an OS (operating system) 151 for performing system control of the client PC 40, and the like.

The printer driver 453 in accordance with the invention is configured such that a prescribed character string contained in print data (referred to as the "document print data" for the sake of description) created by the application software 452 on the client PC 40 is converted to a one-dimensional bar code or a two-dimensional code, the converted code is imparted to the document print data, and the document print data including the code can be printed by the printer 50-*n* of the destination.

And, the printer driver 453 is configured such that even if the printer 50-*n* of the destination is set a toner saving mode to save the used amount of toner, a code imparted to the document print data which is printed by the pertinent printer 50-*n* is printed without having a problem that it is not recognized by a scanning device because of a concentration deficiency or the like.

In this embodiment, the code generated by converting the character string by the printer driver 453 will be described by taking as an example a QR (quick response) code which is one of two-dimensional codes.

In addition, the application software 452 is a program installed in advance on the client PC 40 by a user, and it is assumed that various application programs such as word processing software and spreadsheet software are installed.

The document print data transmitted from the client PC 40 to the printer 50-*n* of the destination are created as the application software 452 stored in the storage unit 45 is read, and the application software 452 is executed by the CPU 41.

Specifically, in the case where the document print data are created by word processing software, through an operating instruction by the user the CPU 41 reads the word processing software from the storage unit 45 and execute it, the document print data are created as desired document print data are entered by the user.

The user carries out setting on a predetermined setting screen of the printer driver 453 to convert to the QR code the specific character strings contained in the document print data, the printer driver 453 converts to the QR code the specific character strings contained in the document print data created by word processing software or the like, and the document print data containing the QR code is transferred to the printer 50-$n$ of the destination through the external interface 42.

On the other hand, the plurality of printers 50-$n$ having different capability and connected to the LAN have a basic structure including a CPU (central processing unit) 51, a print image processing unit 52, an image forming unit 53, a user interface 54, and an external interface 55 as shown in the printer 50-1.

A description of the structure of the plurality of printers 50-$n$ other than the printer 50-1 will be omitted for the sake of description because they have the same structure as that of the printer 50-1.

The CPU 51 of the printer 50-1 controls various units of the printer 50-1 and the respective interfaces 54 and 55 and exercises supervisory control of the printer 50-1 as a whole.

The print image processing unit 52 provides predetermined image processing with respect to the print data and output the print data subjected to the image processing to the image forming unit 53, so that the print data, for which a print instruction has been given, will be formed on printing paper in the image forming unit 53.

The print data for which a print instruction has been given includes the case of only the document print data and the case of the document print data containing the QR code.

On the basis of the print data subjected to image processing by the print image processing unit 52 and transmitted, the image forming unit 53 forms the print data on the printing paper and outputs the same.

The user interface 54 is configured of an operating portion such as buttons for performing various setting operations of the printer 50-1 and the operation of selecting various processing by the user's operation and a display portion for displaying a display screen, and is able to perform the display of desired information and print selecting operation as the user operates the operating portion.

The external interface 55 performs transmission and reception of data and control signals with external devices (hereafter, generally referred to as the "external devices") other than the client PC 40 and the printer 50-1 which are connected thereto through the LAN 30.

Figure 13:
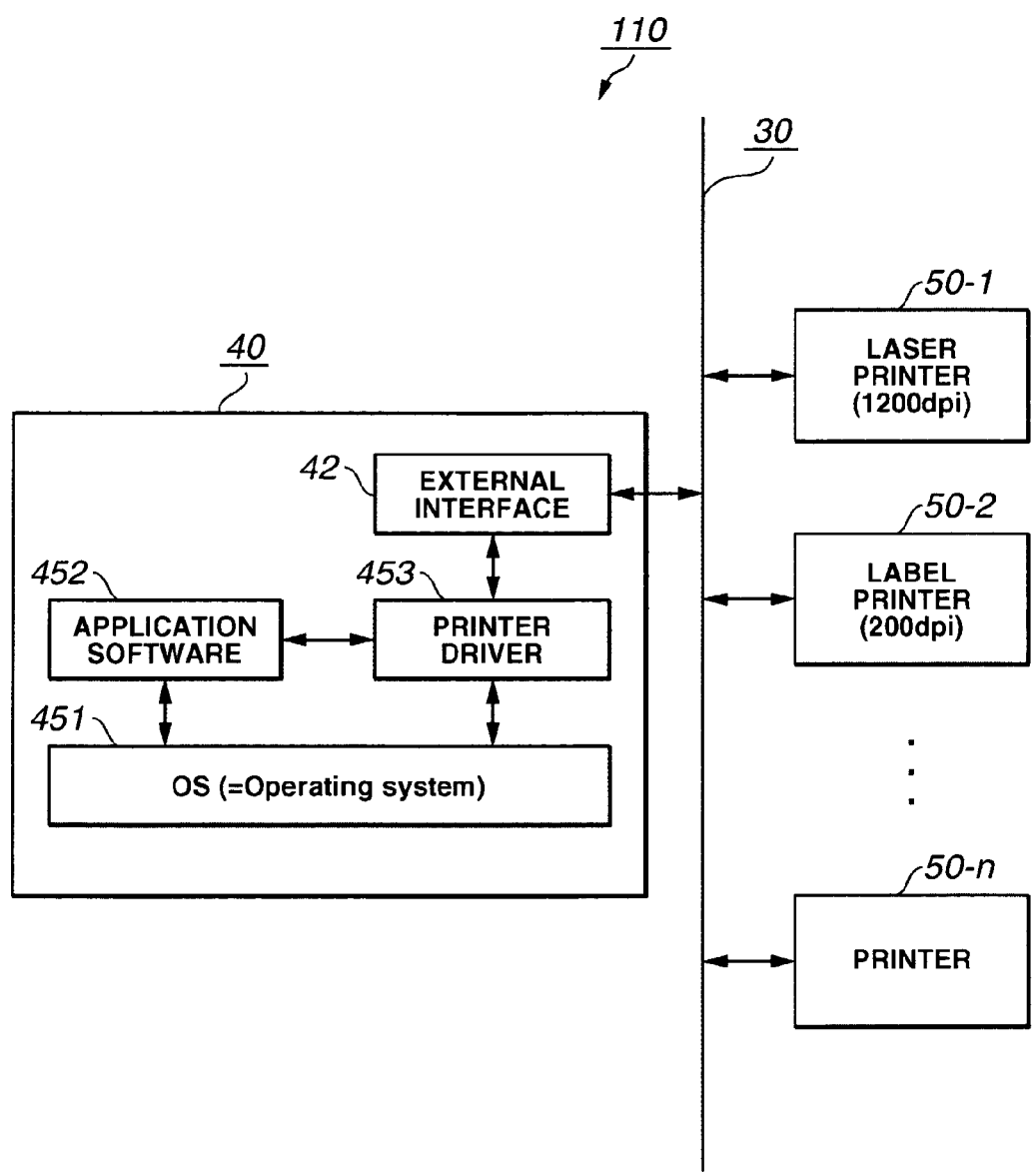
FIG. 13 is a diagram illustrating the configuration of software for performing various processing on a client PC 40.

FIG. 13 is a schematic diagram for explaining the configuration of software for performing various processing on the above-described client PC 40.

As shown in FIG. 13, an OS 451, the printer driver 453, and the application software 452 are installed on the client PC 40 and the OS 451 controls the operation of the printer driver 453 and the application software 452.

As a print instruction is given, the document print data created by the application software 452 are transferred through the printer driver 453 on the client PC 40, the external interface 42 and the LAN 30 as a network to the printer 50-$n$.

The printer driver 453 in accordance with the invention is configured so as to be able to perform the following print control in correspondence with the plurality of printers 50-$n$ connected to the client PC 40 on which the printer driver 453 has been installed.

The printer driver 453 in accordance with the invention is configured so as to be able to convert to the QR code the character string designated by the user in the document print data created by the application software 452 on the basis of setting information of various parameters corresponding to the printers 50-$n$ of the destination of the print data, impart the converted QR code to the document print data, and print out from the printers 50-$n$ of the destination.

The printer driver 453 in accordance with the invention is further configured so as to be able to set arbitrarily or automatically the size of the QR code which has the character string designated by the user in the document print data converted, impart the QR code with the set size to the document print data, and print out from the printers 50-$n$ of the destination.

When the size of the QR code is set automatically, a value of an optimum size corresponding to the capability (e.g., resolution or the like) of the printer 50-$n$ of the designation is automatically determined, and the QR code having the arbitrarily or automatically set size is given to the document print data and printed out from the printer 50-$n$ of the destination.

The printer driver 453 in accordance with the invention is configured so as to be able to arbitrarily or automatically set a parameter value of an error correction level of the QR code with the character string designated by the user in the document print data converted, and imparts the set error correction level of the QR code to the document print data to print out from the printer 50-$n$ of the destination.

When the parameter value of the error correction level is automatically set, the parameter value of the optimum error correction level in accordance with the capability of the printer 50-$n$ of the destination or the parameter value of the optimum error correction level in accordance with the size of the QR code is determined automatically, the arbitrarily or automatically set error correction level of the QR code is imparted to the document print data and printed out from the printer 50-$n$ of the destination.

The printer driver 453 in accordance with the invention is further configured such that printing is effected without having a failure that the QR code imparted to the document print data which is printed out from the printer 50-$n$ of the destination is not recognized by a scanning device because of an insufficient concentration or the like even if a toner saving mode for saving the toner amount used by the printer 50-$n$ of the destination is set.

The print control effected by the printer driver 453 configured as described above is performed on the basis of the setting information set on the printer driver 453 setting screen.

The print control performed by the printer driver 453 on the basis of the setting information set on the printer driver 453 setting screen will be described with reference to FIG. 14 through FIG. 17.

Figure 14:
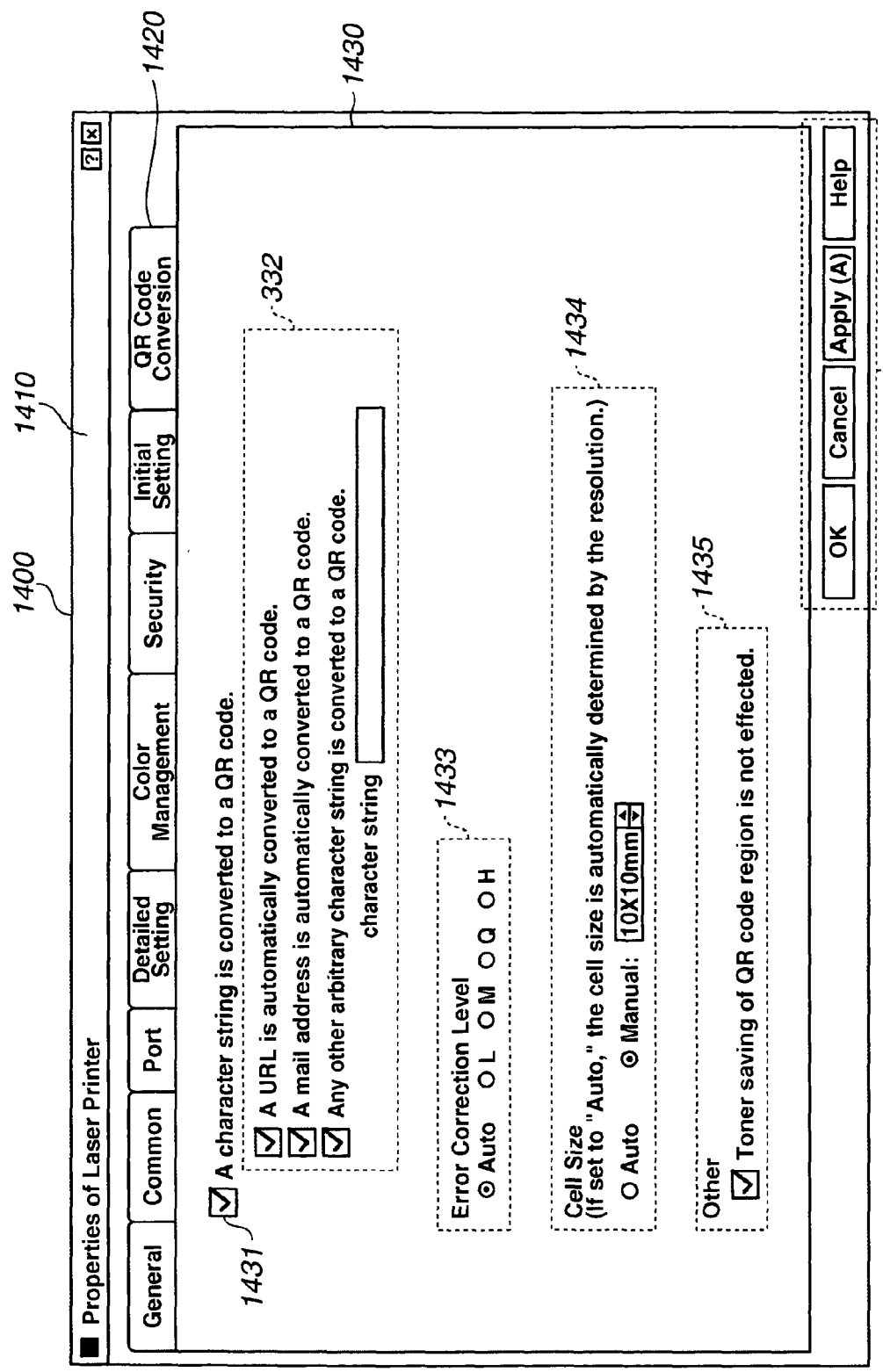
FIG. 14 is a diagram illustrating an example of a setting screen of a printer driver 453.

FIG. 14 is a diagram illustrating an example of a setting screen of the printer driver 453 in accordance with the invention.

FIG. 14 shows an example of the setting screen which is displayed when a QR code conversion tab is selected among a plurality of setting screens of the printer driver 453 in the case where printing is effected by converting a specific character string contained in the document print data to the QR code.

As shown in FIG. 14, a setting screen 1400 (hereafter referred to as the "QR code conversion setting screen 1400") which is displayed when a QR code conversion tab is selected consists of a title bar 1410; a plurality of tabs 1420 respectively corresponding to a plurality of setting screens for performing various settings of the printer driver 453; a setting item setting section 1430 for effecting various settings for QR code conversion; and designating operation buttons 1440 (portion surrounded by the broken line) for effecting the designating operation of the setting, cancellation, application, help, and the like of various setting values which have been set in the setting item setting section 1430. A title reading (for example, a title "Properties of Laser Printer" when the printer of the destination is the laser printer of the printer 50-1) is displayed on the title bar 1410 in correspondence with the plurality of printers 50-n connected to the client PC 40 through the LAN 30.

On the QR code conversion setting screen 1400, it is possible to retrieve and convert the user-designated character string to the QR code with respect to the document print data created by the application software 452 or the like and setting whether or not to effect processing to impart the QR code to the document print data. The setting item setting section 1430 includes a QR code conversion setting item 1431 for selecting whether or not to convert the document print data to a QR code; a character string designating item 1432 (portion surrounded by a broken line) for designating a character string to be converted to a QR code in a case where the document print data are converted to the QR code; an error correction level selecting and designating item 1433 for selecting and designating an error correction level of the QR code to which the designated character string is converted; a cell size selecting and designating item 1434 for setting the cell size of the QR code; and a toner save designating item 1435 (portion surrounded by a broken line) for selecting and designating whether or not to print the QR code in an ordinary print mode which is not a toner saving mode even if the toner saving mode has been set.

In the character string designating item 1432, it is possible to select any or all of "A URL is automatically converted to a QR code," "A mail address is automatically converted to a QR code," and "Any other arbitrary character string is automatically converted to a QR code." In a case where "Any other arbitrary character string is automatically converted to a QR code" is selected, the user effects setting by entering an arbitrary character string to be converted to the QR code.

If "A URL is automatically converted to a QR code" has been selected and set, the character string of the URL in the document print data is converted to the QR code; if "A mail address is automatically converted to a QR code" has been selected and set, the character string of the mail address in the document print data is converted to the QR code; and if "Any other arbitrary character string is automatically converted to a QR code" has been selected and set, the user-designated character string in the document print data is converted to the QR code.

The error correction level selecting and designating item 1433 and the cell size selecting and designating item 1434 are items for selecting and setting the error correction level of the QR code and the cell size at the time of converting the user-designated character string to the QR code. As the error correction level of the QR code, it is possible to set four levels of L, M, Q, and H.

The error correction capability improves in the order of error correction levels L, M, Q, and H. The level L is the lowest in the error correction capability, and the level H is the highest in the error correction capability.

At the time of converting the character string to the QR code, if "Auto" has been selected and set in the error correction level selecting and designating item 1433, an optimum error correction level (any one of L, M, Q, and H) of the QR code corresponding to the resolution of the printer 50-n of the destination or the cell size of the QR code is automatically determined, and the character string is converted to the QR code at the determined error correction level.

If any of the error correction levels L, M, Q and H has been selected and set by the user, the character string is converted to the QR code at the set error correction level (any one of L, M, Q, and H).

If "Auto" has been selected and set in the cell size selecting and designating item 1434, an optimum size of the QR code corresponding to the capability such as the resolution of the printer 50-n of the destination is automatically determined, and the character string is converted to the QR code of the determined size.

If a value of the cell size has been designated by the user, the character string is converted to the QR code of the designated size.

In a case where "Toner saving of QR code region is not effected" has been selected and set in the toner save designating item 1435, even if the toner saving mode is set, print control is performed to print the QR code without performing the thinning-out processing of data which is performed at the resolution of the ordinary print mode or in the toner saving mode.

For the selected and set items in the individual selecting and setting items, a check mark or a dot and data such as a character string or a numerical value are indicated in the check boxes and the individual input columns.

The print control performed by the printer driver 453 will be described on the basis of the setting information set on the QR code conversion setting screen 1400 configured as described above with reference to the flowchart of FIG. 15.

Figure 15:
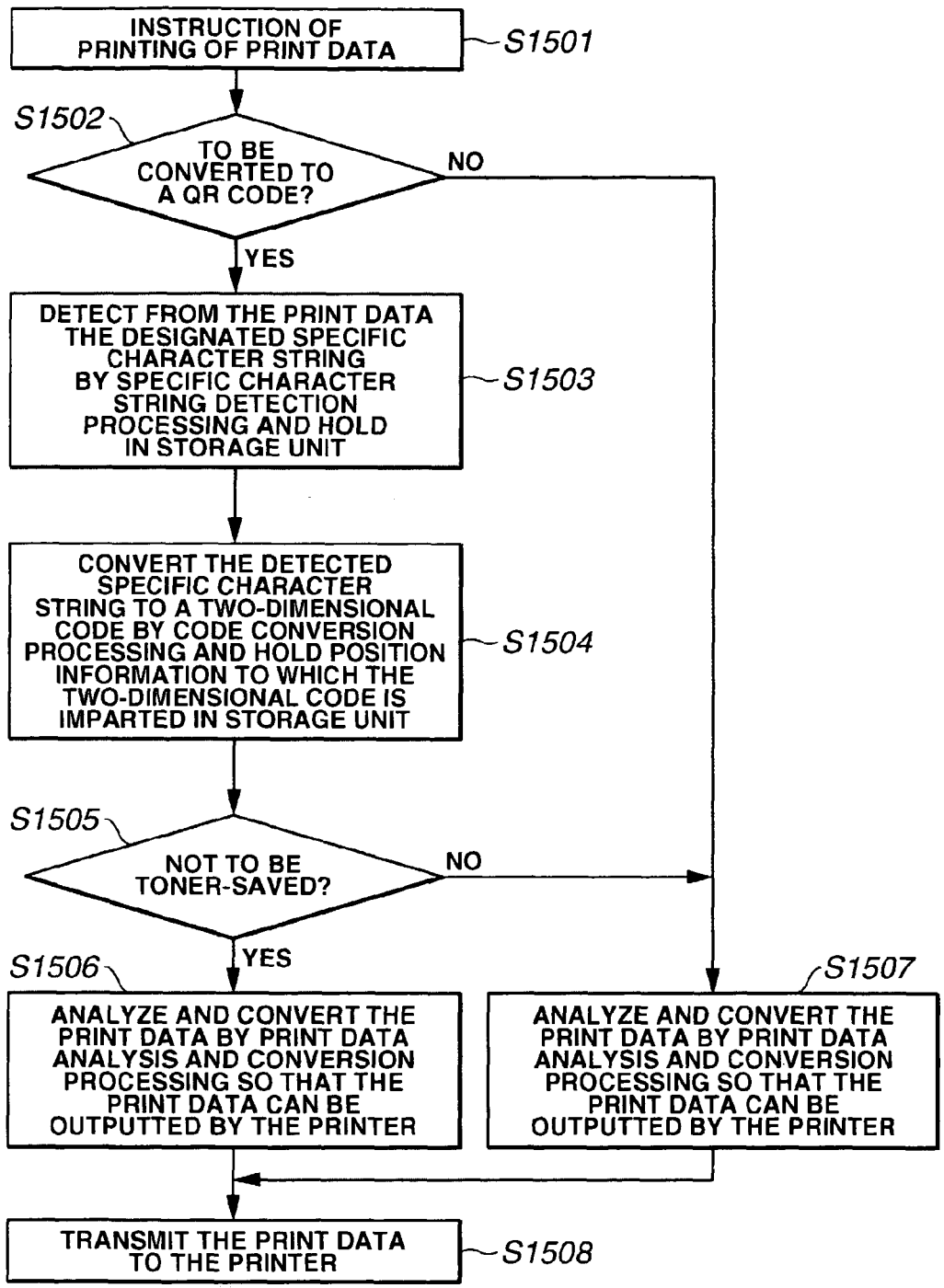
FIG. 15 is a flowchart of print control effected by the printer driver 453 on the basis of setting information set on a QR code conversion setting screen 1400.

As shown in FIG. 15, upon receiving the document print data as well as a print start instruction (step S1501), the printer driver 453 judges on the basis of the setting information set on the QR code conversion setting screen 1400 whether or not to convert a specific character string to a QR code and impart it to the received document print data (step S1502).

In a case where the content of the setting information is set such that a specific character string is not converted to a QR code with respect to the document print data (NO in Step S1502), namely where "A character string is converted to a QR code" is not selected and set in the QR code conversion setting item 1431 on the QR code conversion setting screen 1400 shown in FIG. 14, predetermined image processing is performed by print data analysis and conversion processing so that the received document print data can be outputted by the printer 50-n of the destination (Step S1507), and the image-processed document print data is transmitted to the printer 50-n of the destination (Step S1508).

The transmitted document print data are printed on printing paper by the printer 50-n of the destination.

And, in Step S1502, where the content of the setting information is setting information set such that a specific character string is converted to a QR code and imparted with respect to the document print data (YES in Step S1502), namely where "A character string is converted to a QR code" is selected and set in the QR code conversion setting item 1431 on the QR code conversion setting screen 1400, it is determined by specific character string detection processing whether any or all of "A URL is converted automatically to a QR code", "A mail address is automatically converted to a QR code", and "Any other arbitrary character string is automatically converted to a QR code" have been selected. Character strings corresponding to the selected items are extracted from the document print data and are stored in the storage unit 45 (Step S1503).

Specifically, if "A URL is automatically converted to a QR code" has been set, the document print data are scanned, and a character string corresponding to the URL, e.g., a character string which starts with "http://" until the detection of null data or space data, is extracted as the character string data of the URL and stored in the storage unit 45.

In addition, if "A mail address is automatically converted to a QR code" has been set, character string data corresponding to the mail address are retrieved and extracted in the same way as the aforementioned URL and stored in the storage unit 45.

In addition, if "Any other arbitrary character string is converted to a QR code" has been set, in a case where a character string, e.g., "ABCDEF," has been inputted and set by the user, all the character string data of a line containing "ABCDEF" of the print data are extracted and stored in the storage unit 45.

When the character data (hereinafter referred to as the "specific character string data") are stored in the storage unit 45, the printer driver 453 converts the specific character string data stored in the storage unit 45 to the QR code by code conversion processing, the converted QR code is imparted to the document print data, and position information of the QR code imparted to the document print data is stored in the storage unit 45 (step S1504).

In the code conversion processing, the specific character string data are converted to image data in the QR code on the basis of the number of characters of the specific character string data, the error correction level (any of Auto, L, M, Q, H) set in the error correction level selecting and designating item 1433 on the QR code conversion setting screen 1400, and the setting information (either Auto or the cell size set by the user) set in the cell size selecting and designating item 1434, and the converted QR code is imparted to the document print data.

And, position information (hereinafter referred to as the "QR code region information"; for example, position information on a region where the QR code is printed) indicating a region of the QR code imparted to the document print data is generated and stored in the storage unit 45.

When the QR code is imparted to the document print data and the QR code region information is stored in the storage unit 45, the printer driver 453 judges on the basis of the setting information whether the QR code imparted to the document print data is controlled to print in an ordinary print mode without performing toner saving mode processing if the toner saving mode has been set, and performs analysis and conversion processing of the document print data including the QR code in accordance with the judged result.

Specifically, for setting information which is set not to perform the toner saving mode processing on the QR code (YES in Step S1505) even if the content of the setting information is set to a toner saving mode, namely if "Toner saving of QR code region is not effected" is selected and set in the toner save designating item 1435 on the QR code conversion setting screen 1400 shown in FIG. 14, the QR code is subjected to image processing with the resolution of the ordinary print mode or image processing, which does not perform thinning-out processing of print data effected in a toner saving mode, by print data analysis and conversion processing even if the toner saving mode is set (Step S1506).

In a case where the content of the setting information is that "Toner saving of QR code region is not effected" is not selected and set in the toner save designating item 1435 on the QR code conversion setting screen 1400 (NO in Step S1505), the QR code is also subjected to resolution or image processing corresponding to the individual print modes set with a toner saving mode or an ordinary print mode in the same manner as the document print data by the print data analysis and conversion processing (Step S1507).

When the processing by the print data analysis and conversion processing is completed, the document print data including the processed QR code is transmitted to the printer 50-*n* of the destination (Step S1508).

Thus, an example of a printed matter to be outputted from the printer 50-*n* of the destination under control by the printer driver 453 which performs print control on the basis of the setting information set on the QR code conversion setting screen 1400 will be described with reference to FIGS. 16A, 16B and FIGS. 17A, 17B.

FIGS. 16A, 16B and FIGS. 17A, 17B are diagrams showing examples that destination information with a QR code imparted to a sending slip which is attached to a package is printed by the label printer 50-2 and a copy of the sending slip is printed by the laser printer 50-1.

Figure 16A:
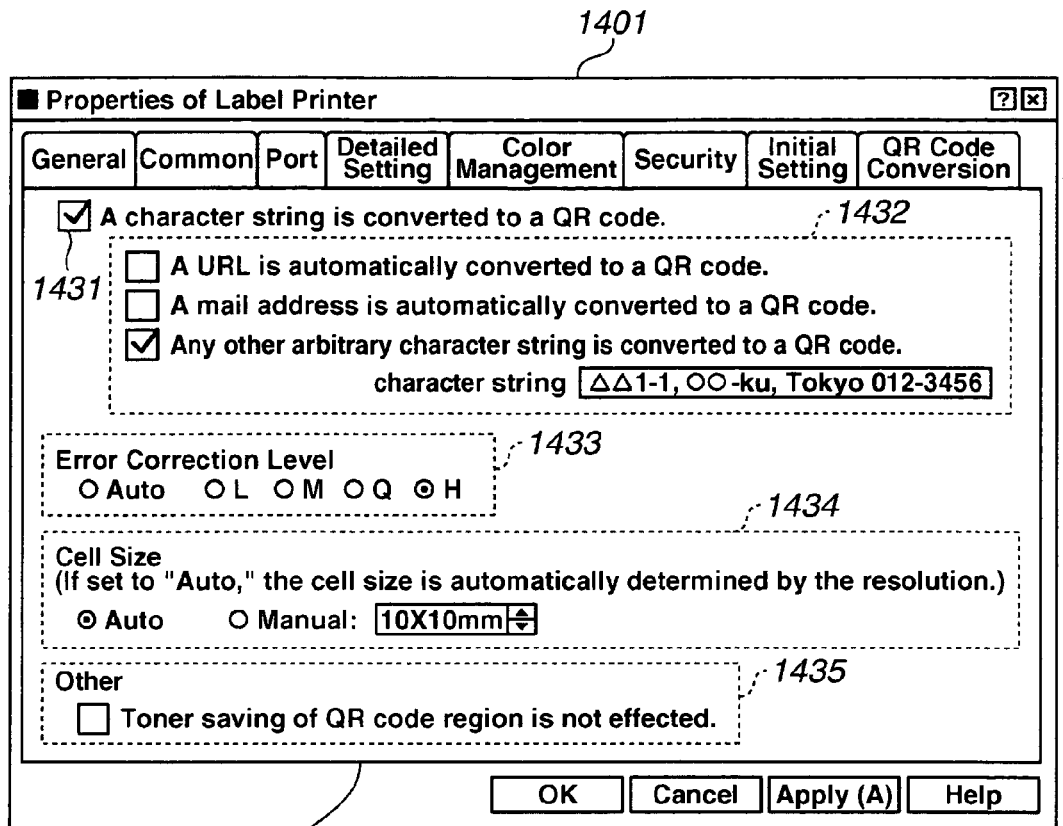
FIG. 16A and FIG. 16B are diagrams illustrating an example of a printed matter 500 printed by a label printer 50-2 of the destination on the basis of setting information set on a QR code conversion setting screen 1401.
Figure 16B:

FIG. 16A shows the QR code conversion setting screen 1401 of the printer driver 453 where a destination of the document print data including the QR code is the label printer 50-2, and FIG. 16B is a diagram showing an example of a sending slip 1600 printed by the label printer 50-2 on the basis of setting information on the QR code conversion setting screen 1401.

Figure 17A:
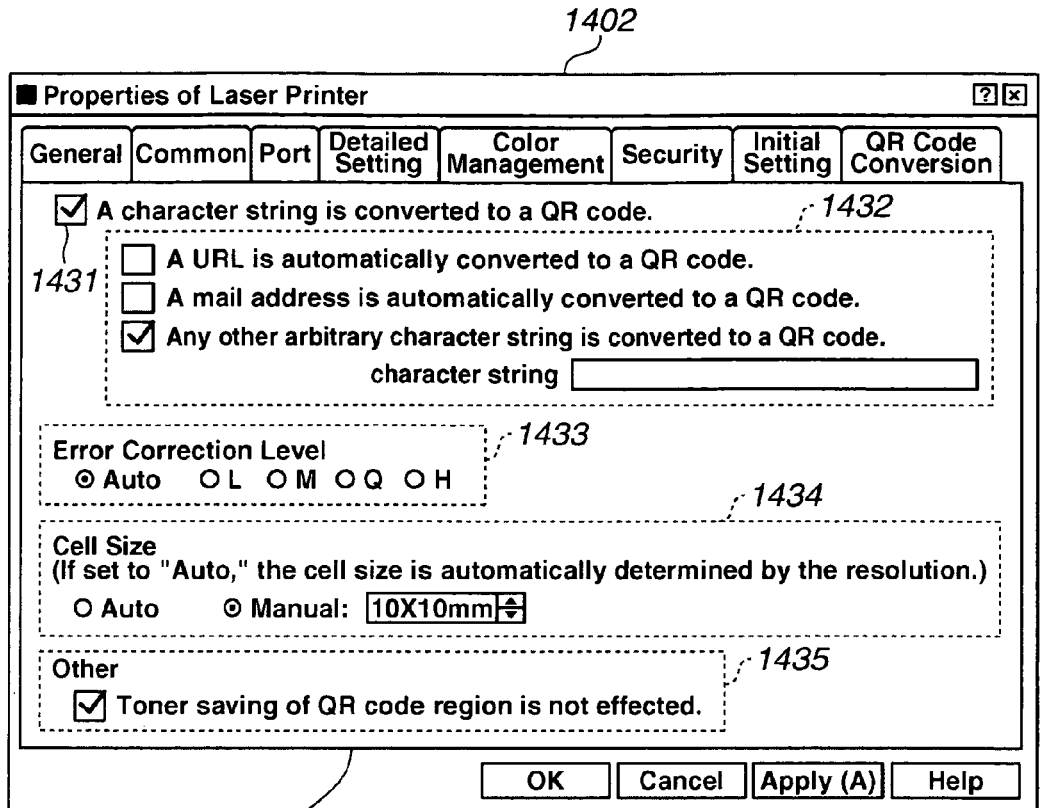
FIG. 17A and FIG. 17B are diagrams illustrating an example of a printed matter 510 printed by a laser printer 50-1 of the destination on the basis of setting information set on a QR code conversion setting screen 1402.
Figure 17B:
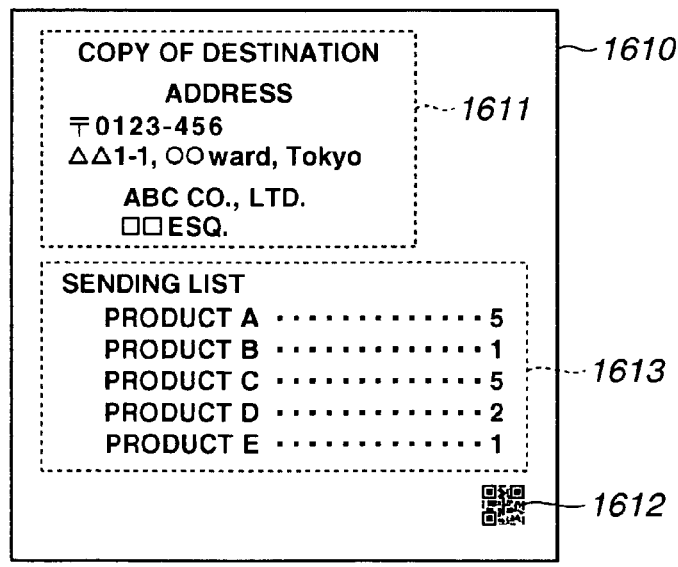

And, FIG. 17A shows a QR code conversion setting screen 1402 of the printer driver 453 where the destination of the document print data including the QR code is the laser printer 50-1, and FIG. 17B is a diagram showing an example of a copy 1610 of the sending slip printed by the laser printer 50-1 on the basis of setting information on the QR code conversion setting screen 1402.

As shown in FIG. 16A, for the content of setting information set by the QR code conversion setting screen 1401, "Any other arbitrary character string is automatically converted to a QR code" is selected and set in the character string designating item 1432 (portion surrounded by the broken line) on the QR code conversion setting screen 1401, designation information "ΔΔ1-1, ○○-ku, Tokyo 012-3456" is designated in a character string entry field, "Auto" is set in the cell size selecting and designating item 1434 (portion surrounded by the broken line), and "H" is set in the error correction level selecting and designating item 1433 (portion surrounded by the broken line). Therefore, the sending slip 1600 shown in FIG. 16B is outputted from the label printer 50-2 according to the print control by the printer driver 453 on the basis of the setting information.

On the sending slip 1600, destination information 1601 (portion surrounded by the broken line) as the document print data is outputted in resolution (e.g., 200 dpi) of the label printer 50-2, and a QR code 1602 corresponding to the destination information 1601 is converted to a QR code of an error correction level H designated by the user in a size automatically determined in accordance with the resolution of the label printer 50-2 and outputted.

As shown in FIG. 17A, for the content of the setting information set on the QR code conversion setting screen 1402, "Any other arbitrary character string is automatically converted to a QR code" is selected and set in the character string designating item 1432 (portion surrounded by the broken line) on the QR code conversion setting screen 1402, designation information "ΔΔ1-1, ○○-ku, Tokyo 012-3456" is designated in the character string entry field, "Auto" is set in the cell size selecting and designating item 1434 (portion surrounded by the broken line), "H" is set in the error correction level selecting and designating item 1433 (portion surrounded by the broken line), and "Toner saving of QR code is not effected" is set in the toner save designating item 1435 (portion surrounded by the broken line). And, when a toner saving mode is set on an unillustrated setting screen, the copy 1610 of the sending slip shown in FIG. 17B is outputted from the laser printer 50-1 by print control of the printer driver 453 on the basis of the setting information.

Destination information 1611 (portion surrounded by the broken line) and sending list information 1613 (portion surrounded by the broken line) which are the document print data are outputted onto the copy 1610 of the sending slip in concentration corresponding to the toner saving mode, and a QR code 1612 corresponding to destination information 511 is outputted in a size of 10×10 mm designated by the user and an error correction level which is optimum in accordance with the size of the QR code 1612.

Thus, even if the printer 50-*n* of the destination is set to a toner saving mode for saving the used amount of the toner, the printer driver 453 according to the invention outputs the QR code which is imparted to the document print data with the resolution in the ordinary print mode or by applying image processing which does not perform thinning-out processing of print data at the time of the toner saving mode, so that a drawback that the QR code printed out from the printer 50-*n* of the destination is not recognized by the scanning device because of concentration deficiency can be prevented.

In the foregoing description, an example has been described in which the printer driver 453 converts the specific character string in the document print data to the QR code on the basis of the setting information set on the prescribed setting screen, and even if the printer 50-*n* of the destination is set to the toner saving mode, the QR code is subjected to image processing for the resolution of the ordinary print mode or not performing thinning-out processing of print data to be executed in the toner saving mode, and the document print data containing the QR code is transmitted to the printer 50-*n*. But, it may be configured to perform the processing which is executed by the printer driver 453 by the controller of the printer 50-*n*.

Figure 18:
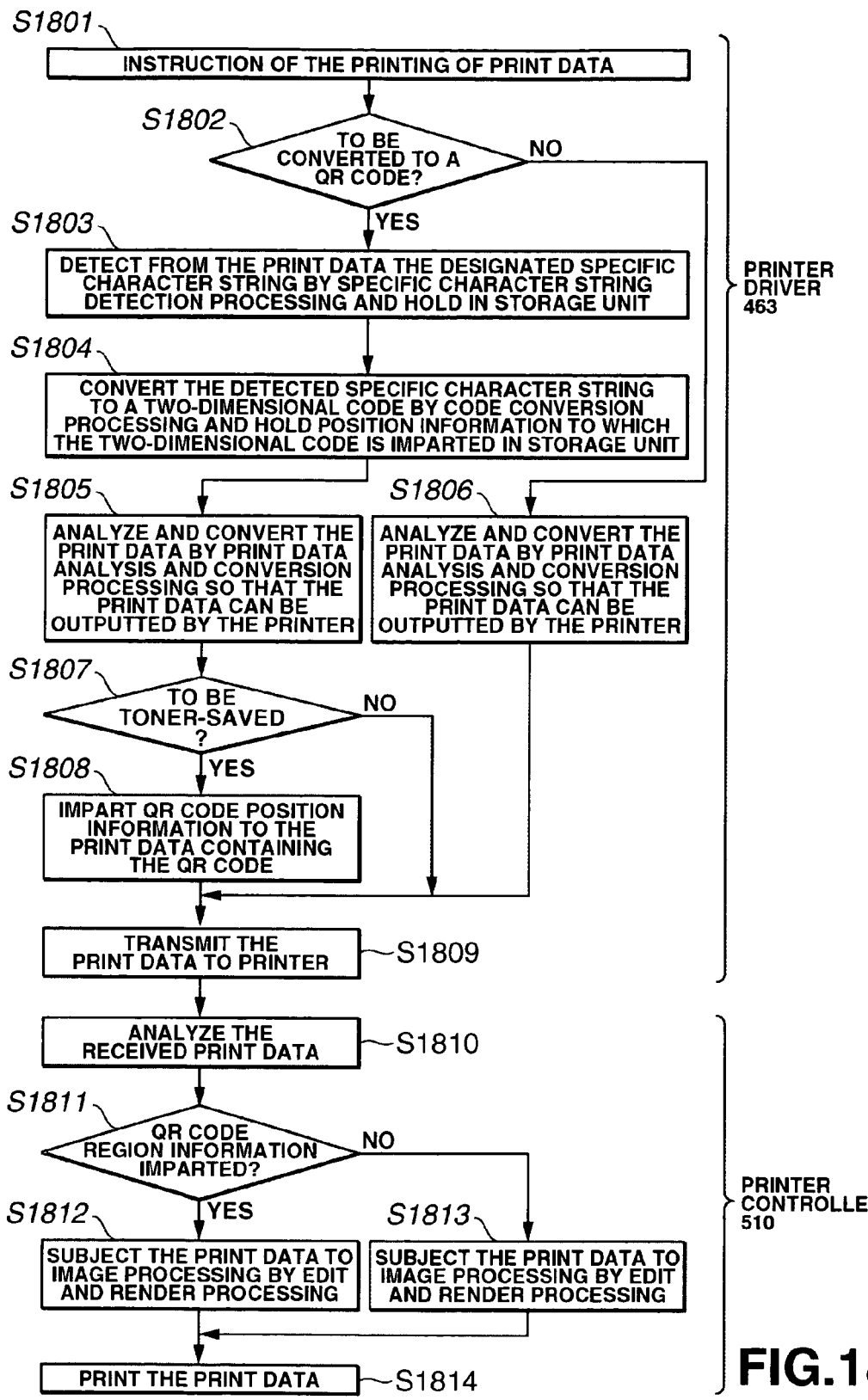
FIG. 18 is a flowchart of print control in a case where a printer driver 463 and a printer controller 510 perform the print control on the basis of setting information set on the QR code conversion setting screen 1400.

FIG. 18 is a flowchart showing control performed by the printer driver 463 and the printer controller 510 in which the CPU (controller) of the printer 50-*n* of the destination converts the specific character string in the document print data to the QR code on the basis of the setting information set on the prescribed setting screen, and even if the printer 50-*n* is set to the toner saving mode, the QR code is subjected to image processing for the resolution of the ordinary print mode or not performing thinning-out processing of print data to be executed in the toner saving mode, and the document print data containing the QR code is printed out.

The printer driver 463 and the printer controller 510 configured as described above are used instead of the printer driver 453 and the CPU 51 (controller) in the printing system 110 and software configuration shown in FIG. 12 and FIG. 13, and the setting screen of the printer driver 463 will be described with reference to the QR code conversion setting screen 1400 shown in FIG. 14 for the sake of description.

As shown in FIG. 18, the printer driver 463 receives a print start instruction and the document print data created by the application software 452 (step S1801), and judges on the basis of the setting information set on the QR code conversion setting screen 1400 whether or not a specific character string is converted to a QR code and imparted to the received document print data (step S1802).

In a case where the content of the setting information is not set to "A character string is converted to a QR code" (NO in S702), specifically in a case where "A character string is converted to a QR code" is not selected and set in the QR code conversion setting item 1431 on the QR code conversion setting screen 1400 shown in FIG. 14, prescribed image processing is performed by the print data analysis and conversion processing such that the document print data received by the printer driver 463 can be outputted by the printer 50-*n* of the destination (step S1806), and the image-processed document print data is transmitted to the printer 50-*n* of the destination (step S1809).

In Step S1802, in a case where the content of the setting information is set to "A character string is converted to a QR code" (YES in S702), specifically, in a case where "A character string is converted to a QR code" is selected and set in the QR code conversion setting item 1431 on the QR code conversion setting screen 1400, the printer driver 463 extracts, on the basis of the setting information set in the character string designating item 1432 on the QR code conversion setting screen 1402, the pertinent character string from the document print data by specific character string detection processing and stores in the storage unit 45 (Step S1803).

When the specific character string data is stored in the storage unit 45, the printer driver 463 converts the specific character string data stored in the storage unit 45 to a QR code by code conversion processing, imparts the converted QR code to the document print data, generates QR code region information which is position information of the QR code imparted to the document print data, and stores in the storage unit 45 (Step S1804).

In the case where the specific character string data is converted to the QR code by the code conversion processing, the specific character string data is converted to image data of the QR code on the basis of the number of characters of the specific character string data, an error correction level (any of Auto, L, M, Q, H) set in the error correction level selecting and designating item 1433 of the QR code conversion setting screen 1400, and the setting information (either Auto or the cell size set by the user) set in the cell size selecting and designating item 1434, and the converted QR code is imparted to the document print data.

When the QR code is imparted to the document print data and the QR code region information is stored in the storage unit 45, the printer driver 463 performs prescribed image processing by the print data analysis and conversion processing such that the document print data including the QR code can be outputted by the printer 50-*n* of the destination (Step S1805).

When the document print data including the QR code is subjected to the prescribed image processing by the print data analysis and conversion processing, the printer driver 463 judges whether or not to control to print the QR code in an ordinary print mode without performing the processing in the toner saving mode even if the toner saving mode has been set on the basis of the setting information which is set in the toner save designating item 1435 on the QR code conversion setting screen 1400, and performs the analysis and conversion processing of the document print data including the QR code on the basis of the judged result.

In a case where the content of the setting information is set to "Toner saving of QR code region is not effected" (YES in Step S1807), the QR code region information stored in the storage unit 45 is imparted to the document print data including the QR code which is undergone the prescribed image processing and transmitted to the printer 50-*n* of the destination (Step S1808, Step S1809).

In a case where the content of the setting information is not set to "Toner saving of QR code region is not effected" in step S1807 (NO in Step S1807), the document print data including the QR code which is undergone the prescribed image processing by the print data analysis and conversion processing is transmitted to the printer 50-*n* of the destination (Step S1809).

On the other hand, the printer controller 510 of the printer 50-*n* of the destination analyzes the received print data, and if QR code region information has been imparted to the print data (YES in Step S1809), image processing, which does not perform thinning-out processing, of the print data (QR code) in a region indicated by the QR code region information is performed by drawing processing even if the toner saving mode has been set (Step S1812), and a QR code in correspondence with the ordinary print is printed out (Step S1814).

If QR code region information has not been imparted to print data in step S1811 (NO in Step S1811), image processing in correspondence with the print mode which is set for the QR code and the print data of the document print data is performed by drawing processing (step S1813), and printing is performed (step S1814).

Figure 19:
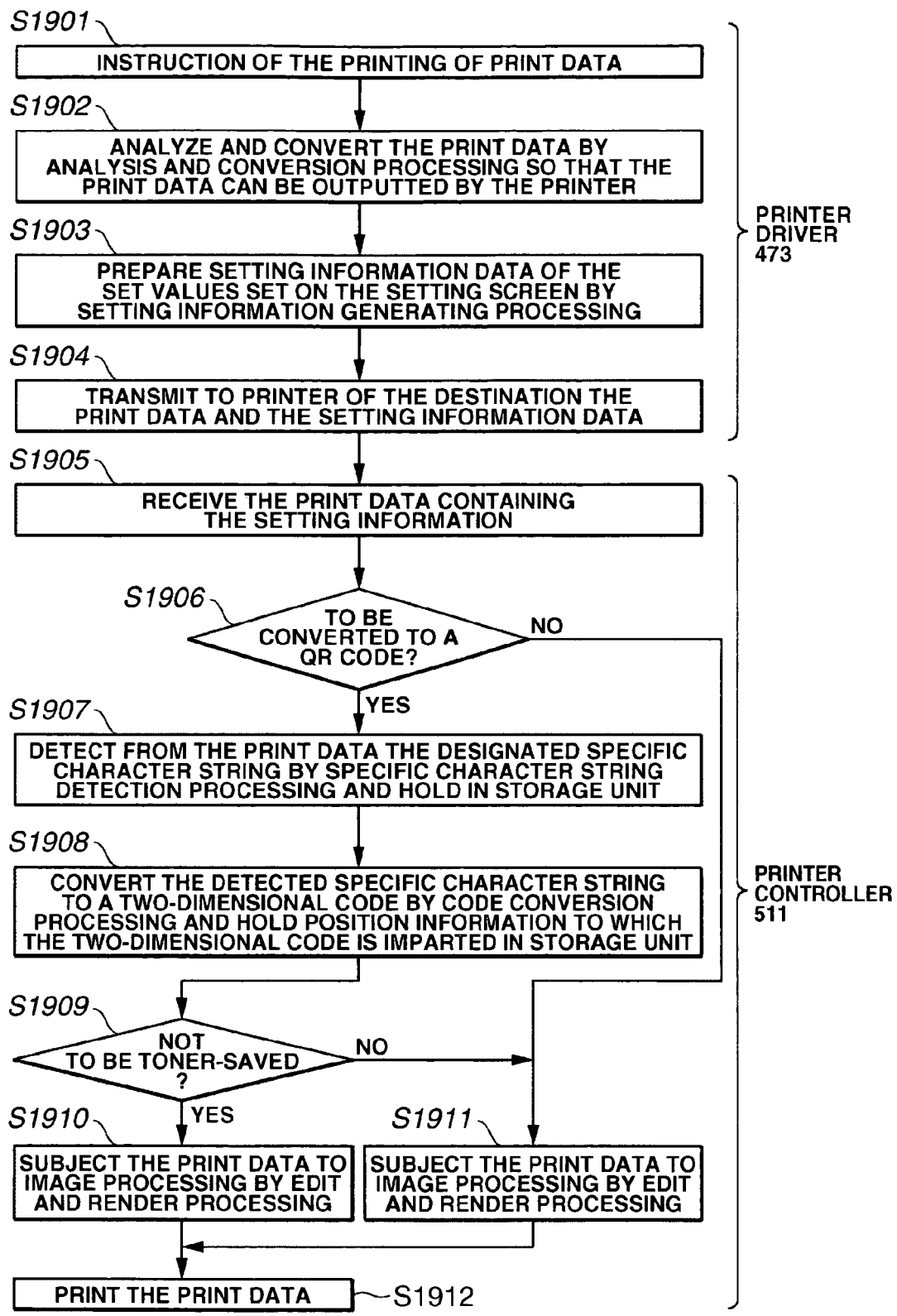
FIG. 19 is a flowchart of print control in a case where a printer driver 473 and a printer controller 511 perform the print control on the basis of setting information set on the QR code conversion setting screen 1400.

FIG. 19 is a flowchart illustrating print control of the printer driver 473 and the printer controller 511 different from the printer driver 463 and the printer controller 510 in a case where it is configured that, even if the CPU (controller) of the printer 50-n of the destination converts a specific character string in the document print data to a QR code on the basis of the setting information which is set on a prescribed setting screen and the printer 50-n has been set to the toner saving mode, the QR code is subjected to image processing for the resolution of the ordinary print mode or not performing thinning-out processing of print data to be executed in the toner saving mode, and the document print data containing the QR code is printed out.

It should be noted that the printer driver 473 and the printer controller 511 in this configuration are configured by replacing the printer driver 453 and the CPU 51 (controller) in the printing system 110 and software configuration shown in FIG. 12 and FIG. 13 with the printer driver 473 and the printer controller 511, and the setting screen of the printer driver 473 will be described with reference to the QR code conversion setting screen 1400 shown in FIG. 14 for the sake of description.

As shown in FIG. 19, upon receiving the document print data created by the application software 452 as a result of a print start instruction (Step S1901), the printer driver 473 effects predetermined image processing with respect to the received document print data by print data analysis and conversion processing, so that printing can be made by the printer 50-n of the destination (Step S1902).

After the image processing of the document print data by the print data analysis and conversion processing, the data on the setting information set on the QR code conversion setting screen 1400 (hereinafter referred to as the "setting information data") are created (Step S1903), the created setting information data and the document print data subjected to the image processing by the print data analysis and conversion processing are transmitted to the printer 50-n of the destination (Step S1904).

Meanwhile, when the printer 50-n of the destination receives the document print data and the setting information data transmitted from the printer driver 473 (Step S1905), the printer controller 511 determines whether or not the setting for converting a specific character string in the document print data to the QR code has been made with reference to the setting information data (Step S1906).

In a case where it is determined in Step S1906 that the setting for conversion to the QR code has been made (YES in Step S1906), the printer controller 511 extracts the pertinent character string from the document print data by the specific character string detection processing on the basis of the setting information set in the character string designating item 1432 on the QR code conversion setting screen 1602 (step S1907), converts the extracted specific character string data to the QR code on the basis of the error correction level and the setting information on the cell size by code conversion processing, imparts the converted QR code to the document print data, and generates QR code region information on the QR code (Step S1908).

After the QR code is imparted to the document print data to generate the QR code region information, even if the toner saving mode has been set on the basis of the setting information determined in the toner save designating item 1435 on the QR code conversion setting screen 1400, it is determined whether or not to control for printing the QR code in the ordinary print mode without performing the processing in the toner saving mode (step S1909).

In a case where the content of setting information is selected and set to "Toner saving of QR code region is not effected" (YES in S1909), specifically in a case where "Toner saving of QR code region is not effected" is selected and set in the toner save designating item 1435 on the QR code conversion setting screen 1400, image processing, which does not perform thinning-out processing, of the print data is performed by editing and drawing processing (step S1910) with respect to the print data (QR code) in a region indicated by the QR code region information even if the toner saving mode has been set, to pint out in a state that the QR code corresponds with the ordinary print mode (Step S1912).

In a case where the content of setting information is not selected and set to "Toner saving of QR code region is not effected" (NO in Step S19009), specifically in a case where "Toner saving of QR code region is not effected" is not selected and set in the toner save designating item 1435 on the QR code conversion setting screen 1400, the QR code is also subjected to the image processing corresponding to the print mode set in the same way as the document print data by editing and drawing processing and printed out (Step S1911, Step S1912).

As described above, the printer driver, the printing system and the print control method in accordance with the invention convert a specific character string in the document print data to the QR code on the basis of the setting information set on a predetermined setting screen of the printer driver, and transmits the document print data containing the converted QR code to the printer of the destination. Therefore, it is possible to print the print data containing the QR code without imparting to the printer a load in the processing of converting the character string to the QR code.

And, a QR code can be generated and printed by converting a specific character string in the document print data to a QR code on the basis of the setting information set on the predetermined setting screen of the printer driver, such that the document print data including the converted QR code can be read surely by a scanning device regardless of the ability of the printer of the destination.

And, the QR code which can be read surely by the scanning device can be printed out regardless of the print mode such as the set toner saving mode or the like.

As described above, a first aspect of the present invention provides a printer driver for holding a setting of various parameters for a printer and effecting conversion of print data from an application, the printer driver includes: a specific character string detecting unit which detects from the print data a specific character string designated by a user; a code converting unit which converts the specific character string detected by the specific character string detecting unit to a code; and a code imparting unit which imparts the code converted by the code converting unit to the print data.

A second aspect of the present invention is the printer driver according to the first aspect of the invention, which may further include a detected-character-string color converting unit which converts a color of the specific character string corresponding to the code converted by the code converting unit to a color designated by the user or a color set automatically.

A third aspect of the present invention is the printer driver according to the second aspect of the present invention, in which the detected-character-string color converting unit may convert the color of the code converted by the code converting unit to the same color as that of the specific character string converted by the detected-character-string color converting unit.

A fourth aspect of the present invention is the printer driver according to the second aspect of the invention, in which when a plurality of specific character strings have been detected by the specific character string detecting unit, and have been converted to a plurality of codes corresponding to the plurality of specific character strings by the code converting unit, the detected-character-string color converting unit may convert the colors of the specific character strings to respectively different colors, and converts the colors of the codes respectively corresponding to the specific character strings to the same colors as those of the specific character strings.

A fifth aspect of the present invention is the printer driver according to the first aspect of the invention, in which the code imparting unit may impart the code converted by the code converting unit to a designated position designated by the user.

A sixth aspect of the present invention is the printer driver according to the fifth aspect of the invention, in which in a case where the designated position designated by the user overlaps with a character or image data in a document, the code imparting unit may retrieve and specify a blank portion in a vicinity and impart the code to a specified position.

A seventh aspect of the present invention is the printer driver according to the first aspect of the invention, in which in a case where the designated position designated by the user overlaps with a character or image data in a document, the code imparting unit may form a blank space by reducing an image of the print data and impart the code to the blank space formed.

An eighth aspect of the present invention is the printer driver according to the first aspect of the invention, in which the code imparting unit may impart the code to a header/footer area which is imparted to the print data.

A ninth aspect of the present invention is the printer driver according to the first aspect of the invention, which may further include a setting unit which sets a size of the code, in which the code converting unit may effect code conversion by optimally setting an error correction level of the code on the basis of the size of the code set by the setting unit.

A tenth aspect of the present invention is the printer driver according to the first aspect of the invention, which may further include a resolution information acquiring unit which acquires resolution information of the printer, in which the code converting unit may effect code conversion by optimally setting an error correction level of the code on the basis of the resolution of the printer acquired by the resolution information acquiring unit.

An eleventh aspect of the present invention is the printer driver according to the first aspect of the invention, which may further include a resolution information acquiring unit which acquires resolution information of the printer, in which the code converting unit may effect code conversion by optimally setting a dot size of the code on the basis of the resolution of the printer acquired by the resolution information acquiring unit.

A twelfth aspect of the present invention is the printer driver according to the first aspect of the invention, in which even in a case of a font which is not installed on a printer, the font may be made to appear to the application as if the font supports the application, and character information of the application may be received by a character code.

A thirteenth aspect of the present invention provides a printer which receives print data received from an application and converted by a printer driver, and performs a print output of the print data, the printer includes: a specific character string detecting unit which analyzes the print data and detects from the print data a specific character string designated by a user; a code converting unit which converts the specific character string detected by the specific character string detecting unit to a code; a code imparting unit which imparts the code converted by the code converting unit to a designated position of the print data; and a detected-character-string color converting unit which converts a color of the specific character string corresponding to the code converted by the code converting unit to a color designated by the user or a color set automatically.

A fourteenth aspect of the present invention provides a printer driver for holding a setting of various parameters for a printer and effecting conversion of print data from an application, the printer driver includes: a specific character string detecting unit which detects from the print data a specific character string designated by a user; a code converting unit which converts the specific character string detected by the specific character string detecting unit to a code; a code imparting unit which imparts the code converted by the code converting unit to the print data; and a toner saving prohibition control unit which selectively prohibits toner saving processing of the code imparted by the code imparting unit in a case where the printer has been set to a toner saving mode.

A fifteenth aspect of the present invention is the printer driver according to the fourteenth aspect of the invention, which may further include a resolution information acquiring unit which acquires resolution information of the printer, in which the code converting unit effects code conversion by optimally setting an error correction level of the code on the basis of the resolution of the printer acquired by the resolution information acquiring unit.

A sixteenth aspect of the present invention is the printer driver according to the fourteenth aspect of the invention, which may further include a resolution information acquiring unit which acquires resolution information of the printer, in which the code converting unit effects code conversion by optimally setting a size of the code on the basis of the resolution of the printer acquired by the resolution information acquiring unit.

A seventeenth aspect of the present invention provides a printing system, which includes a printer driver for holding a setting of various parameters for a printer and effecting conversion of print data from an application and a printer for printing on the basis of print data from the printer driver, in which the printer driver includes: a specific character string detecting unit which detects a specific character string designated by a user from the print data; a code converting unit which converts the specific character string detected by the specific character string detecting unit to a code; a code imparting unit which imparts the code converted by the code converting unit to the print data; a code position information generating unit which generates position information of the code imparted to the print data by the code imparting unit; and a transmitting unit which imparts the code position information generated by the code position information generating unit to the print data and transmits it to the printer, and in which the printer is provided with a toner saving prohibition control unit which selectively prohibits toner saving processing for the code on the basis of the code position information in a case where a toner saving mode has been set.

An eighteenth aspect of the present invention provides a print controlling method for printing print data on the basis of the print data from an application and setting information on various parameters for a printer, the method includes: detecting a specific character string designated by a user from the print data by a specific character string detecting unit; converting the specific character string detected by the specific character string detecting unit to a code by a code converting unit; imparting the code converted by the code converting unit to the print data by a code imparting unit; and selectively prohibiting by a toner saving prohibition control unit toner saving processing for the code imparted by the code imparting unit in a case where a toner saving mode has been set.

According to the printer, the printer driver, and the controlling method thereof in accordance with the above-mentioned aspects of the invention, it is possible to impart to the print data a two-dimensional code converted from a desired character string in the print data and print them without purchasing a special application for converting a character string to a two-dimensional code.

In addition, even in the case of an application in which a special application for converting a character string to a two-dimensional code, or image data cannot be pasted, it is possible to impart to the print data a two-dimensional code converted from a user-designated character string in the print data and print them.

In addition, as the character string in the print data converted to the two-dimensional code is printed in a user-designated color or an automatically set color, the discrimination of the character string converted to the two-dimensional code in the print data can be facilitated.

Furthermore, even in a case where there are a plurality of two-dimensional codes and a plurality of character strings converted to the two-dimensional codes in the print data, since the colors of each character string and each two-dimensional code converted from that character string are printed in the same color, and the plurality of two-dimensional codes and the character strings converted to those two-dimensional codes are printed in different colors, the discrimination of the two-dimensional codes and the character strings converted to those two-dimensional codes can be facilitated further.

In addition, the two-dimensional code converted from the character string can be printed in an area desired by the user.

In addition, even in a case where characters or image data of the print data are present at the position where the two-dimensional code converted from the character string is to be allocated, since a blank portion in the vicinity is retrieved, and the two-dimensional code is printed in the blank portion, it is possible to reliably print the two-dimensional code converted from the character string.

In addition, even in the case where characters or image data of the print data are present at the position where the two-dimensional code converted from the character string is to be allocated, since a blank space is formed by reducing the print data, and the two-dimensional code is printed in that blank portion. Therefore, it is possible to reliably print the two-dimensional code converted from the character string in the vicinity of an area desired by the user.

In addition, since the position where the two-dimensional code converted from the character string is to be allocated can be designated in a header/footer area where the printer driver is capable of imparting information, it is possible to prevent a drawback in that the two-dimensional code and the print data overlap.

In addition, since it is possible to designate a size of the two-dimensional code converted from the character string, it is possible to easily estimate the overlapping of the print data and the two-dimensional code.

In addition, even in a case where the font used in the application is not installed on the printer, the font is made to appear to the application as if the font is installed and supports the application in a simulated manner, and character information of the application is received by character codes. Therefore, the printer driver is capable of reliably detecting the specific character strings.

In addition, the printer driver holds only parameters concerning such as two-dimensional conversion for converting a character string to a two-dimensional code and color conversion for converting the color of a character string converted to the two-dimensional code to a specified color, and the processing of such as two-dimensional conversion and color conversion is effected by the printer. As a result, an advantage is offered in that the load of processing by the client PC can be alleviated.

According to the printer driver, the printing system and the print control method of the above-mentioned aspects of the invention, a character string designated by the user is retrieved from the print data and converted to a one-dimensional bar code or a two-dimensional code, and the converted code can be printed such that it can be read surely by a scanning device regardless of the ability of the printer of the destination.

And, an advantage is offered in that a character string designated by the user is retrieved from the print data and converted to a one-dimensional bar code or a two-dimensional code, and the converted code can be printed such that it can be read surely by a scanning device regardless of a print mode of the printer of the destination.

As described above, by applying the printer, the printer driver, and the controlling method thereof in accordance with the invention, it is possible to impart to the print data a two-dimensional code converted from a desired character string in the print data and print them without purchasing a special application for converting a character string to a two-dimensional code.

In addition, even in the case of an application in which a special application for converting a character string to a two-dimensional code, or image data cannot be pasted, it is possible to impart to the print data a two-dimensional code converted from a user-designated character string in the print data and print them.

In addition, it becomes possible to easily discriminate the specific character string converted to the two-dimensional code in the print data.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosures of Japanese Patent Applications No. 2005-211295 filed on Jul. 21, 2005 and No. 2005-216033, filed on Jul. 26, 2005 including specifications, claims, drawings and abstracts are incorporated herein by reference in their entireties.

What is claimed is:

1. A non-transitory computer readable medium storing a printer driver for holding a setting of various parameters for a printer and effecting conversion of print data from an application, comprising:
   a specific character string detecting unit which retrieves and extracts from the print data created by the application a specific character string designated by a user;
   a resolution information acquiring unit which acquires resolution information of the printer;
   an error correction level reception unit that receives an error correction level from the user, the error correction level designated as auto by the user;
   a code converting unit which converts the specific character string extracted by the specific character string detecting unit based on the resolution information of the printer acquired by the resolution information acquiring unit to a code designated by the user; and
   a code imparting unit which imparts the code converted by the code converting unit to the print data at a designated position designated by the user, wherein
   when the error correction level is auto, the code converting unit automatically sets an optimum error correction level of the code, the optimum error correction level corresponding to the resolution information of the printer.

2. The printer driver according to claim 1, further comprising:
   a detected-character-string color converting unit which converts a color of the specific character string in the print data corresponding to the code converted by the code converting unit to a color designated by the user or a color set automatically.

3. The printer driver according to claim 2, wherein the detected-character-string color converting unit converts the color of the code converted by the code converting unit to the same color as that of the specific character string in the print data converted by the detected-character-string color converting unit.

4. The printer driver according to claim 2, wherein when a plurality of specific character strings have been detected by the specific character string detecting unit, and have been converted to a plurality of codes corresponding to the plurality of specific character strings by the code converting unit, the detected-character-string color converting unit converts the colors of the specific character strings to respectively different colors, and converts the colors of the codes respectively corresponding to the specific character strings to the same colors as those of the specific character strings.

5. The printer driver according to claim 1, wherein in a case where the designated position designated by the user overlaps with a character or image data in a document, the code imparting unit retrieves and specifies a blank portion in a vicinity and imparts the code to a specified position.

6. The printer driver according to claim 1, wherein in a case where the designated position designated by the user overlaps with a character or image data in a document, the code imparting unit forms a blank space by reducing an image of the print data and imparts the code to the blank space formed.

7. The printer driver according to claim 1, wherein the code imparting unit imparts the code to a header/footer area which is imparted to the print data.

8. The printer driver according to claim 1, further comprising:
   a setting unit which sets a size of the code,
   wherein the code converting unit effects code conversion by optimally setting an error correction level of the code on the basis of the size of the code set by the setting unit.

9. The printer driver according to claim 1, further comprising:
   a resolution information acquiring unit which acquires resolution information of the printer,
   wherein the code converting unit effects code conversion by optimally setting a dot size of the code on the basis of the resolution of the printer acquired by the resolution information acquiring unit.

10. The printer driver according to claim 1, wherein even in a case of a font which is not installed on a printer, the font is made to appear to the application as if the font supports the application, and character information of the application is received by a character code.

11. A printer which receives print data from an application converted by a printer driver, and performs a print output of the print data, comprising a processor, wherein the processor function as:
    a specific character string detecting unit which analyzes the print data and retrieves and extracts from the print data a specific character string designated by a user;
    an error correction level reception unit that receives an error correction level from the user, the error correction level the error correction level designated as auto by the user;
    a code converting unit which converts the character specific string extracted by the specific character string detecting unit based on a resolution of the printer itself to a code designated by the user;
    a code imparting unit which imparts the code converted by the code converting unit to a designated position of the print data, the designated position designated by the user; and
    a detected-character-string color converting unit which converts a color of the specific character string in the print data corresponding to the code converted by the code converting unit to a color designated by the user or a color set automatically, wherein
    when the error correction level is auto, the code converting unit automatically sets an optimum error correction level of the code, the optimum error correction level corresponding to the resolution information of the printer.

12. A non-transitory computer readable medium storing a printer driver for holding a setting of various parameters for a printer and effecting conversion of print data from an application, comprising:
    a specific character string detecting unit which retrieves and extracts from the print data created by the application a specific character string designated by a user;
    a resolution information acquiring unit which acquires resolution information of the printer;
    an error correction level reception unit that receives an error correction level from the user, the error correction level designated as auto by the user;
    a code converting unit which converts the specific character string extracted by the specific character string detecting unit based on the resolution information of the printer acquired by the resolution information acquiring unit to a code designated by the user; and
    a code imparting unit which imparts the code converted by the code converting unit to the print data at a designated position designated by the user; and
    a toner saving prohibition control unit which selectively prohibits toner saving processing for the code imparted by the code imparting unit in a case where the printer has been set to a toner saving mode, automatically, wherein
    when the error correction level is auto, the code converting unit automatically sets an optimum error correction level of the code, the optimum error correction level corresponding to the resolution information of the printer.

13. The printer driver according to claim 12, further comprising:
a resolution information acquiring unit which acquires resolution information of the printer,
wherein the code converting unit effects code conversion by optimally setting a size of the code on the basis of the resolution of the printer acquired by the resolution information acquiring unit.

14. A printing system, the printing system including
a printer; and a printer driver for holding a setting of various parameters for the printer and effecting conversion of print data from an application, wherein
the printer prints on the basis of print data from the printer driver,
wherein the printer driver comprises:
a specific character string detecting unit which retrieves and extracts from the print data created by the application a specific character string designated by a user;
a resolution information acquiring unit which acquires resolution information of the printer;
an error correction level reception unit that receives an error correction level from the user, the error correction level the error correction level or designated as auto by the user;
a code converting unit which converts the specific character string extracted by the specific character string detecting unit based on the resolution information of the printer acquired by the resolution information acquiring unit to a code designated by the user;
a code imparting unit which imparts the code converted by the code converting unit to the print data at a designated position designated by the user;
a code position information generating unit which generates position information of the code imparted to the print data by the code imparting unit; and
a transmitting unit which imparts the code position information generated by the code position information generating unit to the print data and transmits it to the printer,
the code converting unit automatically sets an optimum error correction level of the code, the optimum error correction level corresponding to the resolution information of the printer when the error correction level is auto, and
wherein the printer comprises:
a toner saving prohibition control unit which selectively prohibits toner saving processing for the code on the basis of the code position information in a case where a toner saving mode has been set.

15. A print controlling method for printing print data on the basis of the print data from an application and setting information on various parameters for a printer, comprising:
retrieving and extracting by a specific character string detecting unit a specific character string designated by a user from the print data created by the application;
acquiring the resolution information of the printer by a resolution information acquiring unit;
receiving an error correction level from the user, the error correction level designated as auto by the user;
converting the specific character string extracted by the specific character string detecting unit based on the resolution information of the printer acquired by the resolution information acquiring unit to a code designated by the user;
imparting the code converted by the code converting unit to the print data by a code imparting unit at a designated position designated by the user;
selectively prohibiting by a toner saving prohibition control unit toner saving processing for the code imparted by the code imparting unit in a case where a toner saving mode has been set; and
when the error correction level is auto, setting an optimum error correction level of the code, the optimum-error correction level corresponding to the resolution information of the printer.

* * * * *